(12) United States Patent
Park et al.

(10) Patent No.: US 11,449,128 B2
(45) Date of Patent: Sep. 20, 2022

(54) AUGMENTED REALITY PROVISION SERVER, AND METHOD OF AUGMENTED REALITY PROVISION SERVER PROVIDING AUGMENTED REALITY INFORMATION TO MOBILE TERMINAL

(71) Applicant: ROBOPRINT CO.,LTD, Gyeongsan-si (KR)

(72) Inventors: Jung Kyu Park, Daegu (KR); Min Su Kim, Gyeongju-si (KR)

(73) Assignee: ROBOPRINT CO., LTD, Gyeongsan-si (KR)

( * ) Notice: Subject to any disclaimer, the term of this patent is extended or adjusted under 35 U.S.C. 154(b) by 371 days.

(21) Appl. No.: 16/471,072

(22) PCT Filed: May 10, 2019

(86) PCT No.: PCT/KR2019/005606
§ 371 (c)(1),
(2) Date: Jun. 19, 2019

(87) PCT Pub. No.: WO2020/085595
PCT Pub. Date: Apr. 30, 2020

(65) Prior Publication Data
US 2021/0341990 A1  Nov. 4, 2021

(30) Foreign Application Priority Data

Oct. 26, 2018 (KR) .................. 10-2018-0128705
Oct. 26, 2018 (KR) .................. 10-2018-0128706

(51) Int. Cl.
*G06F 3/14* (2006.01)
*G06T 19/00* (2011.01)
(Continued)

(52) U.S. Cl.
CPC ............ *G06F 3/011* (2013.01); *G06F 3/1454* (2013.01); *G06T 19/006* (2013.01); *H04M 1/724* (2021.01);
(Continued)

(58) Field of Classification Search
CPC . G06F 3/011; G06F 3/1454; H04N 5/232935; H04M 1/724; H04M 2250/52; G06T 19/006
See application file for complete search history.

(56) References Cited

U.S. PATENT DOCUMENTS

2012/0223966 A1  9/2012  Lim
2016/0163107 A1  6/2016  Chen et al.
(Continued)

FOREIGN PATENT DOCUMENTS

KR  10-2010-0114819 A  10/2010
KR  10-2011-0012524 A   2/2011
(Continued)

OTHER PUBLICATIONS

KR Office Action in Application No. 10-2018-0128705 dated Jan. 16, 2019.
(Continued)

*Primary Examiner* — Beau D Spratt
(74) *Attorney, Agent, or Firm* — Maschoff Brennan

(57) ABSTRACT

An augmented reality provision server according to an embodiment of the present invention may include a reception unit configured to receive capture information generated by a first mobile terminal and a second mobile terminal capturing a target thing from the first mobile terminal and the second mobile terminal, a control unit configured to select first augmented reality information corresponding to the capture information acquired from the reception unit from among a plurality of pieces of augmented reality
(Continued)

information, and a transmission unit configured to deliver the first augmented reality information to the first mobile terminal and the second mobile terminal. The reception unit may receive predetermined input information from the first mobile terminal. The control unit may generate second augmented reality information including the input information. The transmission unit may transmit the second augmented reality information to the first mobile terminal.

10 Claims, 26 Drawing Sheets

(51) Int. Cl.
    *G06F 3/01*     (2006.01)
    *H04N 5/232*     (2006.01)
    *H04M 1/724*     (2021.01)

(52) U.S. Cl.
    CPC .. *H04N 5/232935* (2018.08); *H04M 2250/52* (2013.01)

(56) References Cited

U.S. PATENT DOCUMENTS

2019/0122045 A1* 4/2019 Ravi ..................... H04L 67/306
2019/0318076 A1* 10/2019 Chun ................ G06K 9/00671
2019/0318540 A1* 10/2019 Piemonte ............ G06F 3/04817
2020/0066046 A1* 2/2020 Stahl ..................... G06T 19/006

FOREIGN PATENT DOCUMENTS

| KR | 10-2012-0074669 A | 7/2012 |
| KR | 10-2013-0012242 A | 2/2013 |
| KR | 10-1292083 B1 | 8/2013 |

OTHER PUBLICATIONS

KR Office Action in Application No. 10-2018-0128706 dated Jan. 16, 2019.
KR Notice of Allowance in Application No. 10-2018-0128705 dated Jun. 4, 2019.
KR Notice of Allowance in Application No. 10-2018-0128706 dated Jun. 4, 2019.
International Search Report in Application No. PCT/KR2019/005606 dated Aug. 26, 2019.

\* cited by examiner (a)

(b)

AUGMENTED REALITY PROVISION SERVER, AND METHOD OF AUGMENTED REALITY PROVISION SERVER PROVIDING AUGMENTED REALITY INFORMATION TO MOBILE TERMINAL

TECHNICAL FIELD

The present invention relates to an augmented reality provision server and a method of the augmented reality provision server providing augmented reality information to a mobile terminal, and more particularly, to an augmented reality provision server and a method of the augmented reality provision server providing augmented reality information to a plurality of terminals.

BACKGROUND ART

Terminals may be classified into mobile/portable terminals and stationary terminals according to mobility.

Furthermore, mobile/portable terminals may be classified into handheld terminals and vehicle mount terminals according to whether or not a user can directly carry.

As it becomes multi-functional, a terminal can be allowed to capture still images or moving images, play music or video files, play games, receive broadcast, and the like, so as to be implemented as an integrated multimedia player.

Efforts are ongoing to support and increase the functionality of terminals. Such efforts include changes and improvements in structural components of the terminals and/or improvements in software.

Generally, conventional terminals provide a variety of information about real things to users by using augmented reality (AR) technology.

The AR technology is applied by a terminal providing Global Positioning System (GPS) information and/or geomagnetic information to a server and by the server determining the location and/or orientation of the mobile terminal on the basis of the provided information and then providing guide information (AR information) for a target being captured by a camera of the terminal.

However, a conventional augmented reality providing service just displays information regarding a building recognized on a location basis or a target thing recognized on a marker basis, the information being provided form an augmented reality information database, and thus fails to provide augmented reality information to users in a more diverse and interesting manner.

DETAILED DESCRIPTION OF THE INVENTION

Technical Problem

The present invention has been made to solve the above problems and is directed to providing an augmented reality provision server capable of providing augmented reality information to a user of a terminal not by merely displaying the augmented reality information but in various ways and a method of an augmented reality provision server providing augmented reality information to a mobile terminal.

Technical problems intended to be solved by the invention are not limited to the aforementioned objects, and other technical objects that are not described herein will be clearly understood by those skilled in the art from the following description and the accompanying drawings.

Technical Solution

According to an embodiment of the present invention, a method of an augmented reality provision server providing augmented reality information to a mobile terminal may include a capture information reception step in which the augmented reality provision server receives capture information generated by a first mobile terminal and a second mobile terminal capturing a target thing from the first mobile terminal and the second mobile terminal; a first augmented reality information transmission step in which the augmented reality provision server selects first augmented reality information corresponding to the capture information received from the first mobile terminal and the second mobile terminal and transmits the first augmented reality information to the first mobile terminal and the second mobile terminal, the first mobile terminal and the second mobile terminal being capable of displaying the first augmented reality information received from the augmented reality provision server to a user; an input information reception step in which the augmented reality provision server receives, from the first mobile terminal, input information generated by the first mobile terminal receiving predetermined information from the user; and a second augmented reality information transmission step in which the augmented reality provision server transmits, to the first mobile terminal, second augmented reality information including the input information received from the first mobile terminal, the first mobile terminal being capable of displaying the second augmented reality information received from the augmented reality provision server to the user.

According to another embodiment of the present invention, an augmented reality provision server may include a reception unit configured to receive capture information generated by a first mobile terminal and a second mobile terminal capturing a target thing from the first mobile terminal and the second mobile terminal, a control unit configured to select first augmented reality information corresponding to the capture information acquired from the reception unit from among a plurality of pieces of augmented reality information, and a transmission unit configured to deliver the first augmented reality information to the first mobile terminal and the second mobile terminal. The reception unit may receive predetermined input information from the first mobile terminal. The control unit may generate second augmented reality information including the input information. The transmission unit may transmit the second augmented reality information to the first mobile terminal.

Advantageous Effects of the Invention

According to the present invention, it is possible to provide augmented reality information to a user of a terminal not by merely displaying the augmented reality information but in various ways.

Advantageous effects of the invention are not limited to the aforementioned effects, and other advantageous effects that are not described herein will be clearly understood by those skilled in the art from the following description and the accompanying drawings.

MODE OF THE INVENTION

Figure 1:
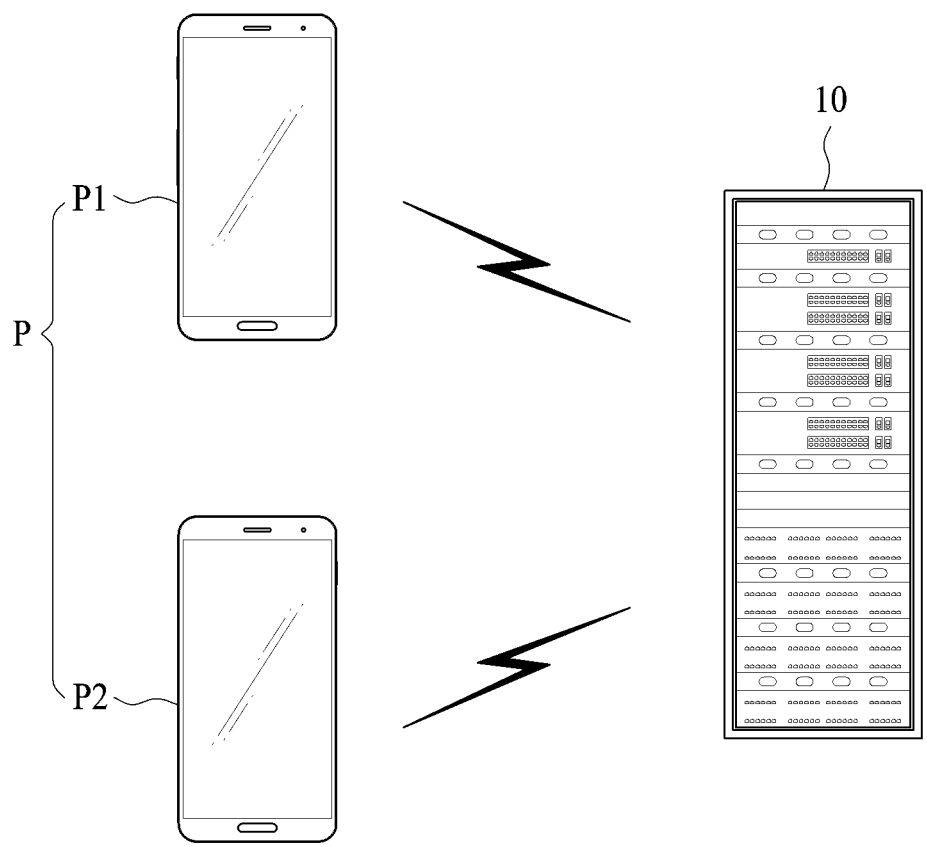
FIG. 1 is a schematic block diagram illustrating a method of an augmented reality provision server providing augmented reality information to a mobile terminal according to an embodiment of the present invention.

Hereinafter, exemplary embodiments of the present invention will be described in detail with reference to the accompanying drawings. However, the spirit of the present invention is not limited to the suggested embodiments, and those skilled in the art to which the present invention pertains could easily suggest a further retrogressive invention or another embodiment which falls within the spirit of the present invention through the addition, modification, and deletion of another component without departing from the spirit of the present invention.

According to an embodiment of the present invention, a method of an augmented reality provision server providing augmented reality information to a mobile terminal may include a capture information reception step in which the augmented reality provision server receives capture information generated by a first mobile terminal and a second mobile terminal capturing a target thing from the first mobile terminal and the second mobile terminal; a first augmented reality information transmission step in which the augmented reality provision server selects first augmented reality information corresponding to the capture information received from the first mobile terminal and the second mobile terminal and transmits the first augmented reality information to the first mobile terminal and the second mobile terminal, the first mobile terminal and the second mobile terminal being capable of displaying the first augmented reality information received from the augmented reality provision server to a user; an input information reception step in which the augmented reality provision server receives, from the first mobile terminal, input information generated by the first mobile terminal receiving predetermined information from the user; and a second augmented reality information transmission step in which the augmented reality provision server transmits, to the first mobile terminal, second augmented reality information including the input information received from the first mobile terminal, the first mobile terminal being capable of displaying the second augmented reality information received from the augmented reality provision server to the user.

Also, the input information reception step may further include a display condition information reception step in which the augmented reality provision server receives, from the first mobile terminal, display condition information generated by the first mobile terminal receiving condition information regarding displaying of the input information from the user, and the display condition information may be information regarding the displaying of the input information on the second mobile terminal.

Also, the display condition information may be information regarding whether the input information is to be displayed on the second mobile terminal. In the second augmented reality information transmission step, the augmented reality provision server may transmit the second augmented reality information to the second mobile terminal when the display condition information is a condition allowing the input information to be displayed on the second mobile terminal, and the augmented reality provision server may not transmit the second augmented reality information to the second mobile terminal when the display condition information is a condition not allowing the input information to be displayed on the second mobile terminal.

Also, the display condition information may be information regarding a location at which the input information is displayed on the second mobile terminal.

Also, the display condition information may be information regarding an order in which the input information is displayed on the second mobile terminal.

Also, the display condition information may be information regarding a period in which the input information is displayed on the second mobile terminal.

Also, the display condition information may be information regarding a point of time at which the input information starts to be displayed on the second mobile terminal.

Also, the input information reception step may further include a display condition information reception step in which the augmented reality provision server receives, from the first mobile terminal, display condition information generated by the first mobile terminal receiving condition information regarding the displaying of the input information from the user, and the display condition information may be information regarding the displaying of the input information on the first mobile terminal.

Also, the display condition information may be information regarding a location at which the input information is displayed on the first mobile terminal relative to the target thing.

Also, the first augmented reality information may include displayable information regarding a location at which the input information is displayable relative to the target thing.

Also, the second augmented reality information may include only the input information at the display location of the input information relative to the target thing and may include overlap information in which a plurality of pieces of information input through a plurality of mobile terminals other than the first mobile terminal overlap each other at locations other than the display location of the input information relative to the target thing.

Also, the second augmented reality information may be information including the input information corresponding to a period from a first point of time to a second point of time. In this case, the input information may be gradually blurred from the first point of time to the second point of time.

According to another embodiment of the present invention, an augmented reality provision server may include a reception unit configured to receive capture information generated by a first mobile terminal and a second mobile terminal capturing a target thing from the first mobile terminal and the second mobile terminal, a control unit configured to select first augmented reality information corresponding to the capture information acquired from the reception unit from among a plurality of pieces of augmented reality information, and a transmission unit configured to deliver the first augmented reality information to the first mobile terminal and the second mobile terminal. The reception unit may receive predetermined input information from the first mobile terminal. The control unit may generate second augmented reality information including the input information. The transmission unit may transmit the second augmented reality information to the first mobile terminal.

The reception unit may receive predetermined display condition information from the first mobile terminal, and the display condition information may be information regarding displaying of the input information on the second mobile terminal.

The display condition information may be information regarding whether the input information is to be displayed on the second mobile terminal, and the control unit may transmit the second augmented reality information to the second mobile terminal through the transmission unit when the display condition information is a condition allowing the input information to be displayed on the second mobile terminal and may not transmit the second augmented reality information to the second mobile terminal through the transmission unit when the display condition information is a condition not allowing the input information to be displayed on the second mobile terminal.

Also, the display condition information may be information regarding a location at which the input information is displayed on the second mobile terminal.

Also, the display condition information may be information regarding an order in which the input information is displayed on the second mobile terminal.

Also, the display condition information may be information regarding a period in which the input information is displayed on the second mobile terminal.

Also, the display condition information may be information regarding a point at which the input information starts to be displayed on the second mobile terminal.

The reception unit may receive predetermined display condition information from the first mobile terminal, and the display condition information may be information regarding the displaying of the input information on the first mobile terminal.

Also, the display condition information may be information regarding a location at which the input information is displayed on the first mobile terminal with respect to the target thing.

Also, the first augmented reality information may include displayable information regarding a location at which the input information is displayable relative to the target thing.

Also, the second augmented reality information may include only the input information at the display location of the input information relative to the target thing and may include overlap information in which a plurality of pieces of information input through a plurality of mobile terminals other than the first mobile terminal overlap each other at locations other than the display location of the input information relative to the target thing.

Also, the second augmented reality information may be information including the input information corresponding to a period from a first point of time to a second point of time. In this case, the input information may be gradually blurred from the first point of time to the second point of time.

According to another embodiment of the present invention, a method of an augmented reality provision server providing augmented reality information to a mobile terminal may include a location information reception step in which the augmented reality provision server receives location information, which is information regarding where the mobile terminal is located, from the mobile terminal; a capture information reception step in which the augmented reality provision server receives capture information generated by the mobile terminal capturing a target thing from the mobile terminal; and a corresponding augmented reality information transmission step in which the augmented reality provision server delivers, to the mobile terminal, corresponding augmented reality information among a plurality of pieces of augmented reality information when a predetermined condition is satisfied on the basis of the location information and capture information received from the mobile terminal, the mobile terminal being capable of displaying the corresponding augmented reality information received from the augmented reality provision server to a user, wherein the predetermined condition may be a condition on whether the location information corresponds to location information previously input to the augmented reality provision server and whether the capture information corresponds to capture information previously input to the augmented reality provision server.

Also, the predetermined condition may be a condition in which first corresponding augmented reality information among the plurality of pieces of augmented reality information is transmitted to the mobile terminal when the capture information corresponds to any one of a plurality of pieces of the previously input capture information and the location information corresponds to first location information among a plurality of pieces of the previously input location information and in which second corresponding augmented reality information among the plurality of pieces of augmented reality information is transmitted to the mobile terminal when the capture information corresponds to any one of the plurality of pieces of the previously input capture information and the location information corresponds to second location information among the plurality of pieces of the previously input location information.

Also, the location information may be information regarding where the mobile terminal is located when the capture information is generated.

Also, the location information may be generated in association with the generation of the capture information.

Also, the method may further include a locational augmented reality information transmission step in which when the location information does not correspond to the previously input location information, the augmented reality provision server transmits locational augmented reality information based on the location information to the mobile terminal, the mobile terminal being capable of displaying the locational augmented reality information received from the augmented reality provision server to the user.

Also, in the location information reception step, a period in which the augmented reality provision server receives the location information from the mobile terminal is shorter when the location information does not correspond to the previously input location information than when the location information corresponds to the previously input location information.

Also, the locational augmented reality information may be information regarding the location information and the previously input location information.

Also, the locational augmented reality information may include information regarding a direction and a distance between the location information and the previously input location information.

Also, when there are a plurality of pieces of the previously input location information, the locational augmented reality information may include order information for the plurality of pieces of the previously input location information.

Also, the order information may be determined by distances between the location information and the plurality of pieces of the previously input location information.

Also, the order information may be determined by the number of times the corresponding augmented reality information is transmitted.

According to another embodiment of the present invention, an augmented reality provision server may include a reception unit configured to receive location information which is information regarding where a mobile terminal is located and capture information which is generated by the mobile terminal capturing a target thing from the mobile terminal; a control unit configured to select corresponding augmented reality information when a predetermined condition is satisfied on the basis of the location information and the capture information acquired from the reception unit among a plurality of pieces of augmented reality information; and a transmission unit configured to deliver the corresponding augmented reality information to the mobile terminal, and the predetermined condition may be a condition whether the location information corresponds to location information previously input to the control unit and whether the capture information corresponds to capture information previously input to the control unit.

Also, the predetermined condition may be a condition in which first corresponding augmented reality information among the plurality of pieces of augmented reality information is transmitted to the mobile terminal when the capture information corresponds to any one of a plurality of pieces of the previously input capture information and the location information corresponds to first location information among a plurality of pieces of the previously input location information and in which second corresponding augmented reality information among the plurality of pieces of augmented reality information is transmitted to the mobile terminal when the capture information corresponds to any one of the plurality of pieces of the previously input capture information and the location information corresponds to second location information among the plurality of pieces of the previously input location information.

Also, the location information may be information regarding where the mobile terminal is located when the capture information is generated.

Also, the location information may be generated in association with the generation of the capture information.

Also, when the location information does not correspond to the previously input location information, the control unit may transmit locational augmented reality information to the mobile terminal through the transmission unit on the basis of the location information.

Also, a period in which the reception unit receives the location information from the mobile terminal may be shorter when the location information does not correspond to the previously input location information than when the location information corresponds to the previously input location information.

Also, the locational augmented reality information may be information regarding the location information and the previously input location information.

Also, the locational augmented reality information may include information regarding a direction and a distance between the location information and the previously input location information.

Also, when there are a plurality of pieces of the previously input location information, the locational augmented reality information may include order information for the plurality of pieces of the previously input location information.

Also, the order information may be determined by distances between the location information and the plurality of pieces of the previously input location information.

Also, the order information may be determined by the number of times the corresponding augmented reality information is transmitted.

An augmented reality information providing method according to another embodiment of the present invention relates to an augmented reality information providing method that provides augmented reality information to a mobile terminal in association with an image drawn on a target thing in a predetermined work order and may include a capture information reception step in which an augmented reality provision server receives capture information generated by the mobile terminal capturing the target thing from the mobile terminal; an augmented reality information transmission step in which the augmented reality provision server selects augmented reality information corresponding to the capture information received from the mobile terminal and transmits the selected augmented reality information to the mobile terminal, the mobile terminal being capable of displaying the augmented reality information received from the augmented reality provision server to a user, an input information reception step in which the augmented reality provision server receives, from the mobile terminal, input information generated by the mobile terminal receiving an input from the user; and a corresponding augmented reality information transmission step in which the augmented reality provision server transmits, to the mobile terminal, corresponding augmented reality information corresponding to the input information received from the mobile terminal, the mobile terminal being capable of displaying the corresponding augmented reality information received from the augmented reality provision server to the user. The input information may be information regarding a method of displaying the image on the target thing in the mobile terminal. The corresponding augmented reality information may include information in which the image is being drawn on the target thing in a display method corresponding to the input information.

Also, the input information may include information allowing the image to be displayed on the target thing in the mobile terminal in the work order, and the corresponding augmented reality information may include information in which the image is being drawn on the target thing in the work order.

Also, the input information may include information regarding a direction in which the user touches the mobile terminal, and the corresponding augmented reality information may include information in which the image is being drawn on the target thing in the touch direction.

Also, the input information may include information regarding a point at which the user touches the mobile terminal, and the corresponding augmented reality information may include information in which a region of the image corresponding to the touch point is being drawn on the target thing.

Also, the input information may include information allowing the image to be displayed on the target thing in the mobile terminal in the work order and information regarding the point at which the user touches the mobile terminal, and the corresponding augmented reality information may include information in which a portion of the image is being drawn on the target thing in the work order and information in which a region corresponding to the touch point of another portion of the image is being drawn.

Also, the input information may further include information regarding a method of displaying an additional image which is different from the image, and the corresponding augmented reality information may include information in which the additional image is being drawn on the target thing.

Also, the input information may further include information regarding a method of displaying the image and the additional image on the target thing in the mobile terminal, and the corresponding augmented reality information may include information in which a portion of the image is being drawn on the target thing and information in which the additional image is being drawn.

An augmented reality provision server according to another embodiment of the present invention relates to an augmented reality provision server that provides augmented reality information to a mobile terminal in association with an image drawn on a target thing in a predetermined work order and may include a reception unit configured to receive capture information generated by the mobile terminal capturing the target thing from the mobile terminal; a control unit configured to select augmented reality information corresponding to the capture information received from the mobile terminal, and a transmission unit configured to transmit the selected augmented reality information to the mobile terminal. The reception unit may receive, from the mobile terminal, input information generated by the mobile terminal receiving an input from a user. The control unit may generate corresponding augmented reality information corresponding to the input information received from the mobile terminal. The reception unit may deliver the corresponding augmented reality information to the mobile terminal. The input information may be information regarding a method of displaying the image on the target thing in the mobile terminal. The corresponding augmented reality information may include information in which the image is being drawn on the target thing in a display method corresponding to the input information.

Also, the input information may include information allowing the image to be displayed on the target thing in the mobile terminal in the work order, and the corresponding augmented reality information may include information in which the image is being drawn on the target thing in the work order.

Also, the input information may include information regarding a direction in which the user touches the mobile terminal, and the corresponding augmented reality information may include information in which the image is being drawn on the target thing in the touch direction.

Also, the input information may include information regarding a point at which the user touches the mobile terminal, and the corresponding augmented reality information may include information in which a region of the image corresponding to the touch point is being drawn on the target thing.

Also, the input information may include information allowing the image to be displayed on the target thing in the mobile terminal in the work order and information regarding the point at which the user touches the mobile terminal, and the corresponding augmented reality information may include information in which a portion of the image is being drawn on the target thing in the work order and information in which a region corresponding to the touch point of another portion of the image is being drawn.

Also, the input information may further include information regarding a method of displaying an additional image which is different from the image, and the corresponding augmented reality information may include information in which the additional image is being drawn on the target thing.

Also, the input information may further include information regarding a method of displaying the image and the additional image on the target thing in the mobile terminal, and the corresponding augmented reality information may include information in which a portion of the image is being drawn on the target thing and information in which the additional image is being drawn.

The same reference numerals are used to designate elements having the same functions in the same spirit range shown in the drawings of each embodiment.

However, in order to describe the present invention in more detail, even elements having the same functions in the same spirit range may be described using other reference numerals in some cases in order to more clearly describe the invention.

Figure 2:
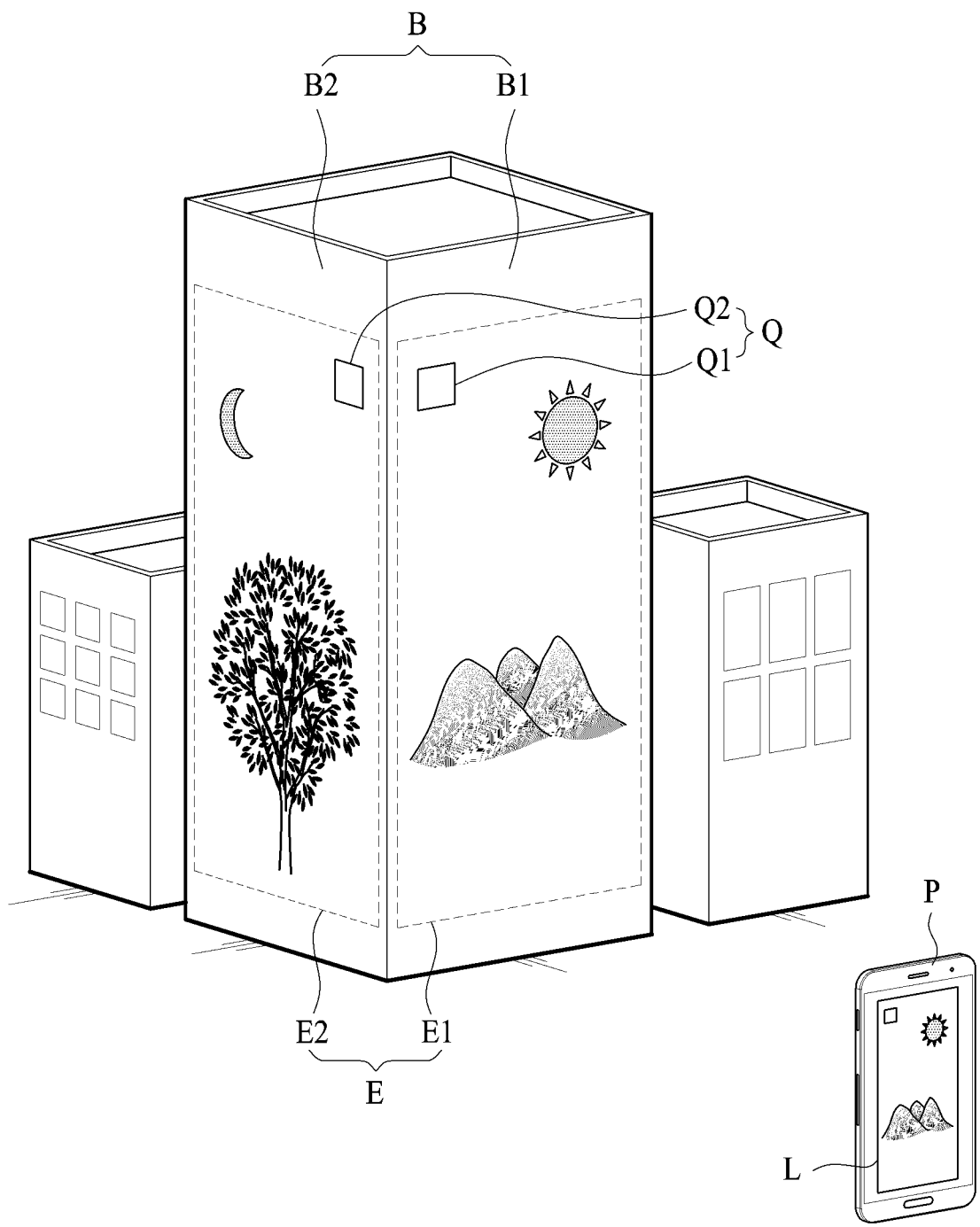
FIG. 2 is a schematic perspective view showing a target thing and a mobile terminal.

FIG. 1 is a schematic block diagram illustrating a method of an augmented reality provision server providing augmented reality information to a mobile terminal according to an embodiment of the present invention, and FIG. 2 is a schematic perspective view showing a target thing and a mobile terminal.

FIGS. 3 to 12 are schematic diagrams showing that augmented reality information is displayed on a mobile terminal by the method of the augmented reality provision server providing the augmented reality information to the mobile terminal according to an embodiment of the present invention.

FIGS. 13 to 18 are schematic diagrams illustrating another function of the method of the augmented reality provision server providing the augmented reality information to the mobile terminal according to an embodiment of the present invention.

FIGS. 19 to 24 are schematic diagrams illustrating still another function of the method of the augmented reality provision server providing the augmented reality information to the mobile terminal according to an embodiment of the present invention.

Figure 25:
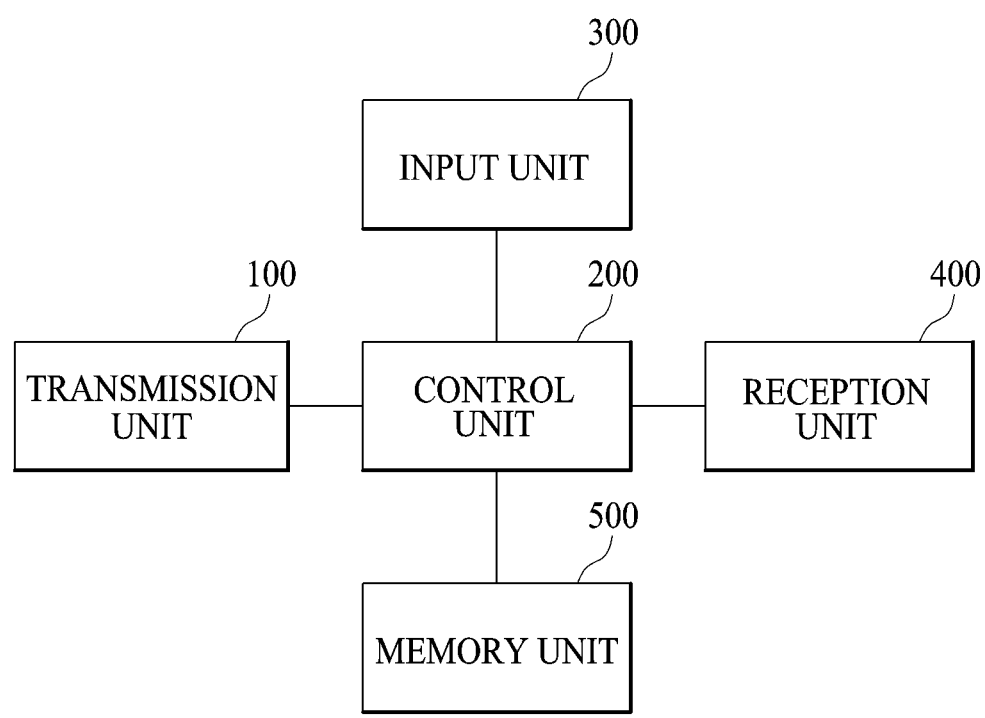
FIG. 25 is a schematic block diagram of the augmented reality provision server that implements the method of providing the augmented reality information of the present invention.
Figure 26:
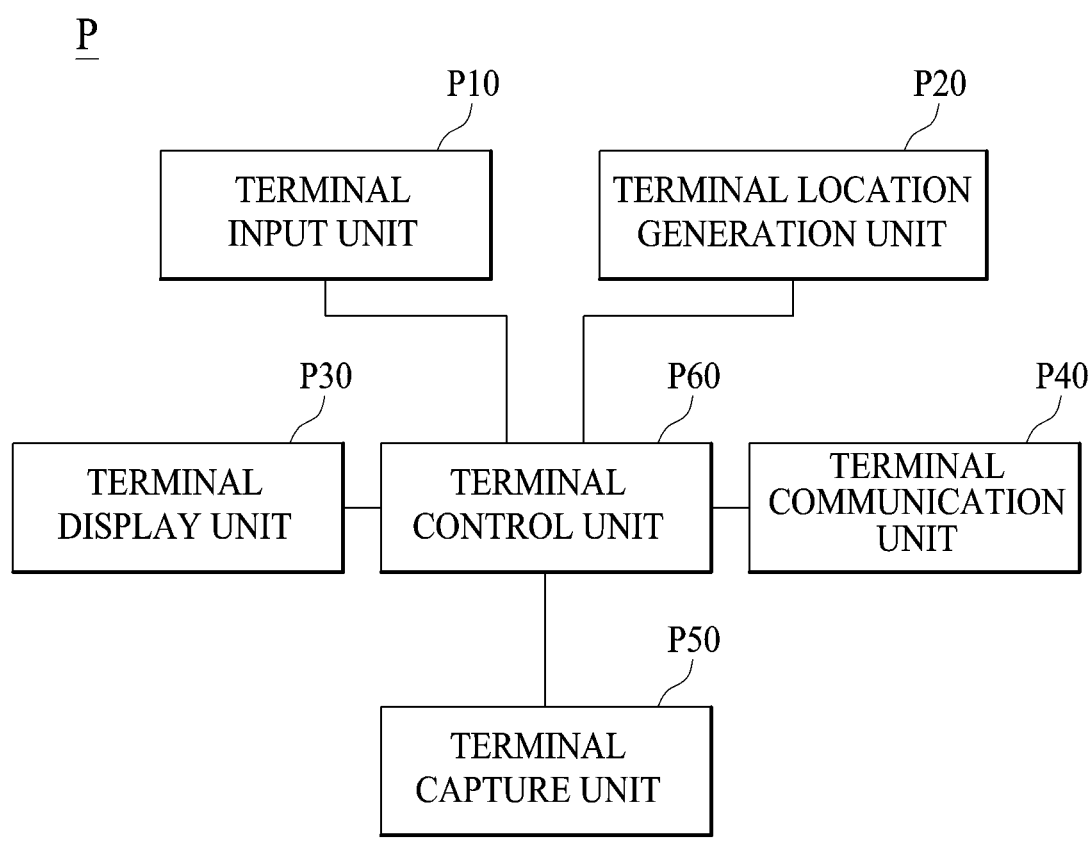
FIG. 26 is a schematic block diagram of the mobile terminal.

FIG. 25 is a schematic block diagram of the augmented reality provision server that implements the method of providing the augmented reality information of the present invention, and FIG. 26 is a schematic block diagram of the mobile terminal.

In the accompanying drawings, which are included to provide a further understanding of the invention, parts that are not relevant to the technical spirit of the present invention or that can easily be derived from those skilled in the art are simplified or omitted.

As shown in FIGS. 1 to 12, the method of the augmented reality provision server providing the augmented reality information to the mobile terminal according to an embodiment of the present invention may be implemented by transmission and reception of a variety of information and/or data between the augmented reality provision server 10 and the mobile terminal P.

As an example, the method of the augmented reality provision server providing the augmented reality information to the mobile terminal may include a capture information reception step in which the augmented reality provision server 10 receives capture information L generated by a first mobile terminal P1 and a second mobile terminal P2 capturing a target thing B from the first mobile terminal P1 and the second mobile terminal P2.

In detail, for example, as shown in FIG. 2, the mobile terminal P may capture the target thing B, and the capture information L may be generated in the mobile terminal P by capturing the target thing B.

As an example, the target thing B may be a building, but the present invention is not limited thereto. Any object that can be a capture target of the terminal may correspond to the target thing B.

For convenience of description, however, the following description assumes that the target thing B is a building.

Here, for example, a separate identification object for the augmented reality provision server 10 to provide augmented reality information to the mobile terminal P may be displayed on the target thing B.

As an example, the identification object may be displayed on the target thing B in the form of a quick response (QR) code or a wall painting having a predetermined image E.

Furthermore, as an example, the building itself may be the identification object.

That is, the capture information L for the augmented reality provision server 10 to provide the augmented reality information to the mobile terminal P may be the building itself or the separate QR code or wall painting displayed on the building.

Meanwhile, the information received from the mobile terminal P in order for the augmented reality provision server 10 to provide the augmented reality information to the mobile terminal P is not limited to only the capture information and may be voice information generated by a user entering his or her voice through the mobile terminal P.

Here, the mobile terminal P may be a mobile device such as a tablet computer, a smartphone, or a wearable computer, but the present invention is not limited thereto. The mobile terminal P may indicate an electronic device such as a desktop which can not be carried.

As an example, the mobile terminal P may conceptually include a plurality of mobile terminals P1 and P2.

That is, the mobile terminal P may conceptually include a plurality of mobile terminals P1 and P2 that may be owned by a plurality of users.

As an example, the first mobile terminal P1 may be a terminal owned by a person named "A," and the second mobile terminal P2 may be a terminal owned by a person named "B,"

As an example, each of the first mobile terminal P1 and the second mobile terminal P2 may capture the target thing B, generate the capture information L, and transmit the generated capture information L to the augmented reality provision server 10.

That is, the augmented reality provision server 10 may receive the capture information L or voice information from each of the first mobile terminal P1 and the second mobile terminal P2.

For convenience of description, however, the following description assumes that the augmented reality provision server 10 receives the capture information L from each of the first mobile terminal P1 and the second mobile terminal P2.

Here, as an example, the method of the augmented reality provision server providing the augmented reality information to the mobile terminal may further include a first augmented reality information transmission step in which the augmented reality provision server 10 selects first augmented reality information A1 corresponding to the capture information L received from the first mobile terminal P1 and the second mobile terminal P2 and transmits the selected first augmented reality information A1 to the first mobile terminal P1 and the second mobile terminal P2.

As an example, the augmented reality provision server 10 may store a plurality of pieces of augmented reality information and may select any one piece corresponding to the capture information L from among the plurality of pieces of augmented reality information.

As an example, the augmented reality provision server 10 may determine whether there is augmented reality information corresponding to the capture information L on the basis of the capture information L. When there is no augmented reality information corresponding to the capture information L, the augmented reality provision server 10 may not select the augmented reality information.

For convenience of description, any one piece corresponding to the capture information L among the plurality of pieces of augmented reality information will be referred to as the first augmented reality information A1.

The augmented reality provision server 10 may deliver the selected first augmented reality information A1, which corresponds to the capture information L, to each of the first mobile terminal P1 and the second mobile terminal P2.

Figure 3:
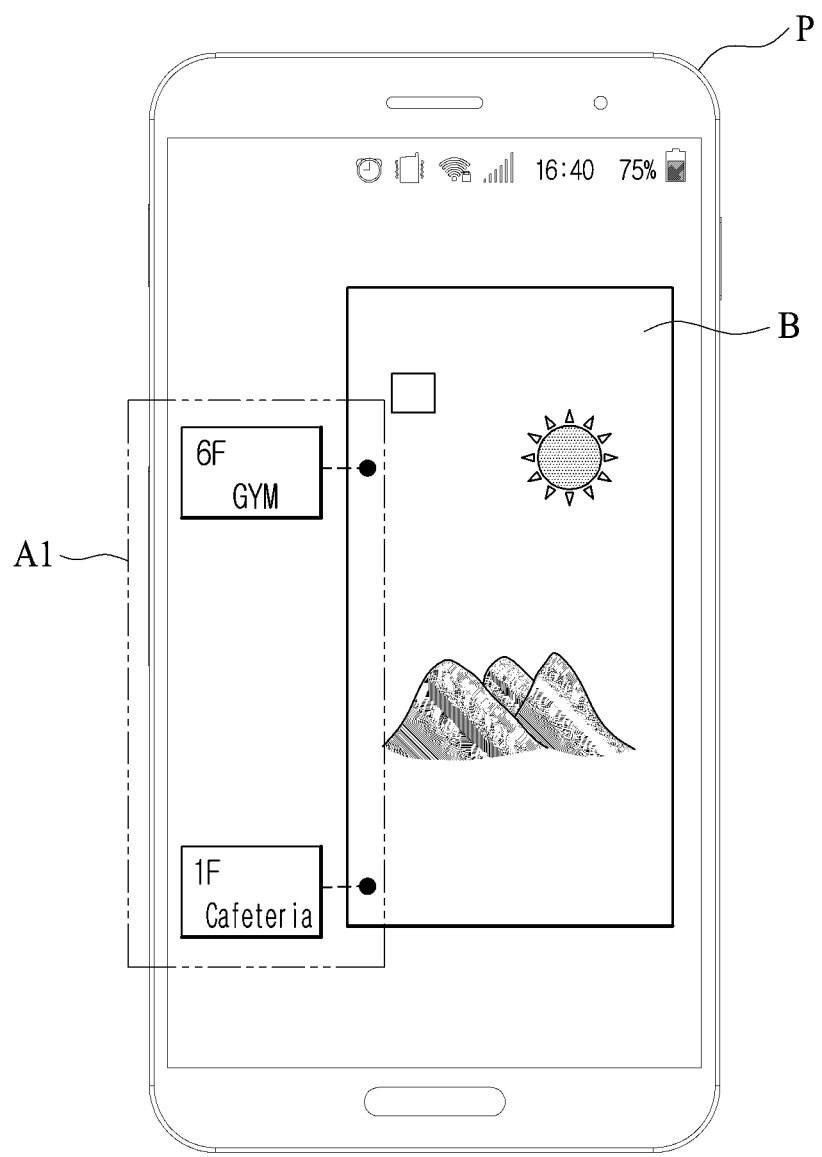
FIGS. 3 to 12 are schematic diagrams showing that augmented reality information is displayed on a mobile terminal by the method of the augmented reality provision server providing the augmented reality information to the mobile terminal according to an embodiment of the present invention.

As a result, as shown in FIG. 3, the first augmented reality information A1 received from the augmented reality provision server 10 may be displayed on the first mobile terminal P1. Similarly, the first augmented reality information A1 may also be displayed on the second mobile terminal P2.

As an example, the first augmented reality information A1 may be information related to the building or information unrelated to the building. For convenience of description, however, the following description assumes that the information is related to the building.

As an example, the first augmented reality information A1 may refer to information regarding a facility existing in each floor of the building.

As an example, the first augmented reality information A1 may include information indicating that there is a cafeteria on the first floor and information indicating that there is a gym on the sixth floor, as shown in FIG. 3.

Here, as an example, the method of the augmented reality provision server providing the augmented reality information to the mobile terminal may further include an input information reception step in which the first mobile terminal P1 receives predetermined information from a user and generates input information I and the augmented reality provision server 10 receives the input information I from the first mobile terminal P1.

In detail, the user, that is, the owner of the first mobile terminal P1 may generate the input information I such as a character, an image E, and a video through the first mobile terminal P1 while the first mobile terminal P1 displays the first augmented reality information A1, and the first mobile terminal P1 may deliver the input information I to the augmented reality provision server 10.

That is, as shown in FIG. 3, for example, the user of the first mobile terminal P1 may enter characters "'I want someone to exercise together" through the first mobile terminal P1 to generate the input information I, and the first mobile terminal p1 may transmit the input information I to the augmented reality provision server 10.

Here, as an example, the method of the augmented reality provision server providing the augmented reality information to the mobile terminal may further include a second augmented reality information transmission step in which the augmented reality provision server 10 transmits second augmented reality information A2 including the input information I received from the first mobile terminal P1 to the first mobile terminal P1.

In detail, when the input information I is received from the first mobile terminal P1, the augmented reality provision server 10 may generate the second augmented reality information A2 including the input information I and the first augmented reality information A1 and deliver the second augmented reality information A2 to the first mobile terminal P1.

Figure 4:
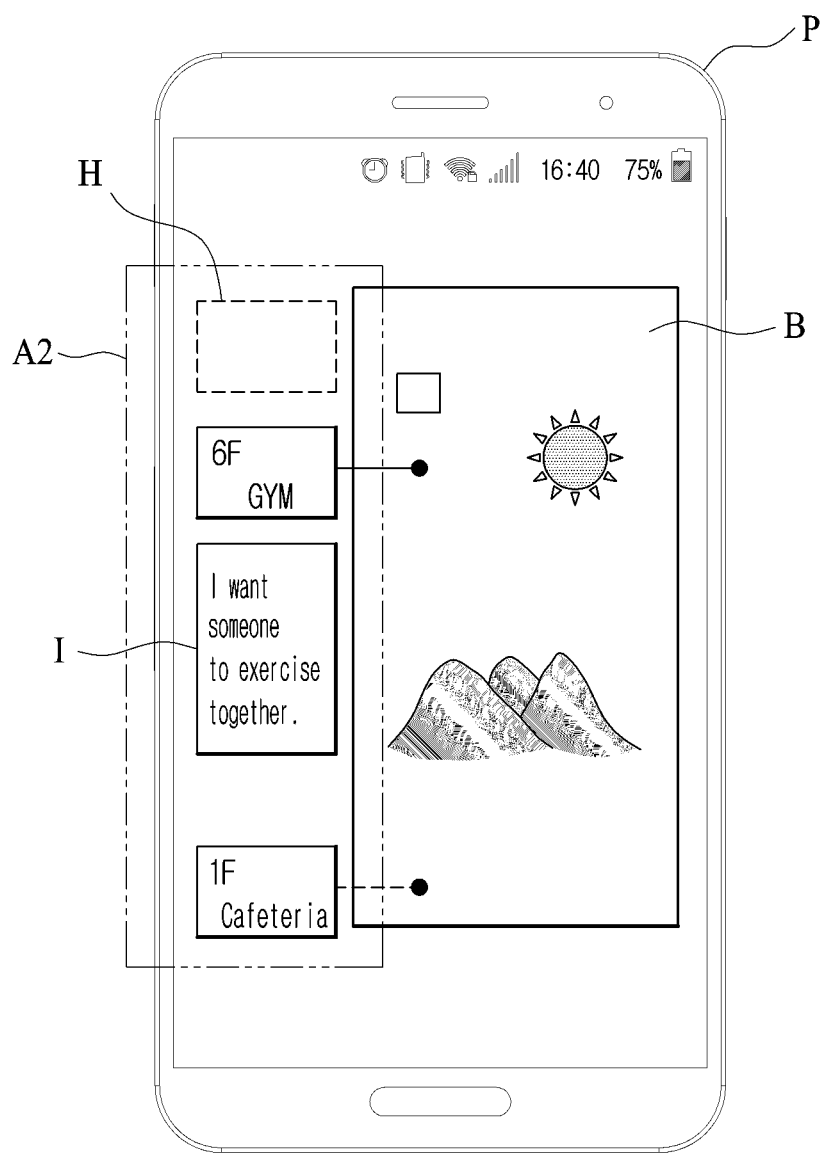

In this case, as shown in FIG. 4, the second augmented reality information A2 received from the augmented reality provision server 10 may be displayed on the first mobile terminal P1.

That is, the augmented reality provision server 10 may generate the second augmented reality information A2 including the characters "I want someone to exercise together," which indicate the input information I received from the first mobile terminal P1 and may deliver the second augmented reality information A2 to the first mobile terminal P1. The first mobile terminal P1 may receive the second augmented reality information A2 including the characters "I want someone to exercise together," which indicate the input information I formed through an input by himself/herself from the augmented reality provision server 10 and may display the second augmented reality information A2 to the user.

Accordingly, the method of the augmented reality provision server providing the augmented reality information to the mobile terminal may provide a variety of augmented reality information to the user not by the augmented reality provision server 10 unidirectionally providing augmented reality information to the mobile terminal P but by receiving predetermined information from the mobile terminal P, updating the input information I, and providing the input information I to the mobile terminal P.

Here, as an example, the input information reception step may further include a display condition information reception step in which the first mobile terminal P1 receives condition information regarding displaying of the input information I from the user and generates display condition information and the augmented reality provision server 10 receives the generated display condition information from the first mobile terminal P1. As an example, the display condition information may be information regarding the displaying of the input information on the second mobile terminal P2.

Figure 5:
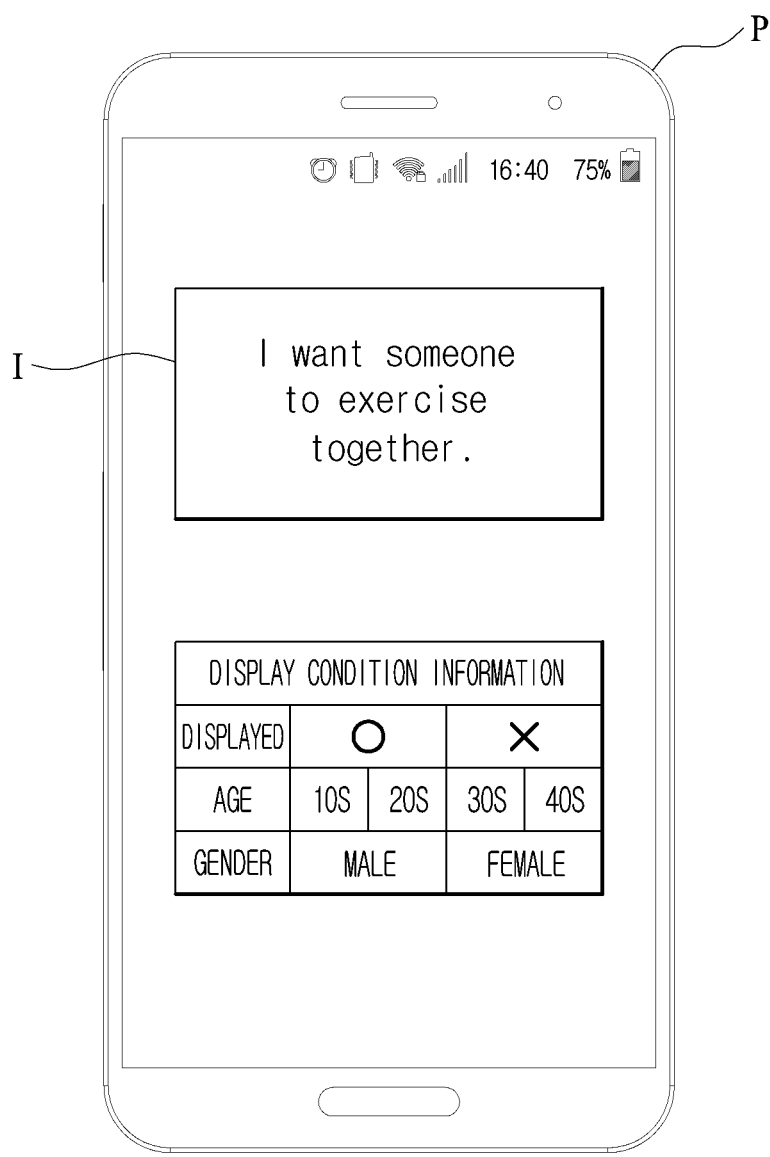
Figure 6:
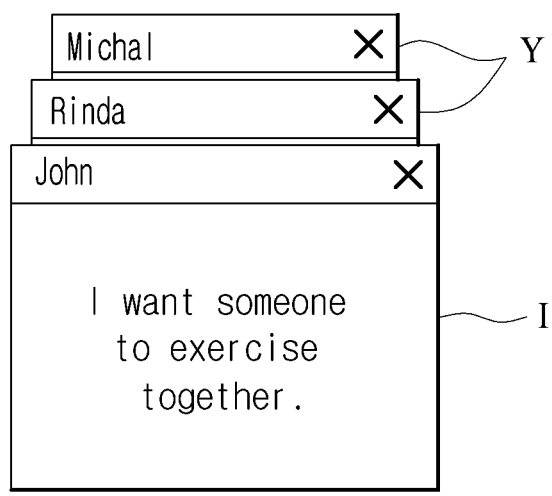
Figure 6:
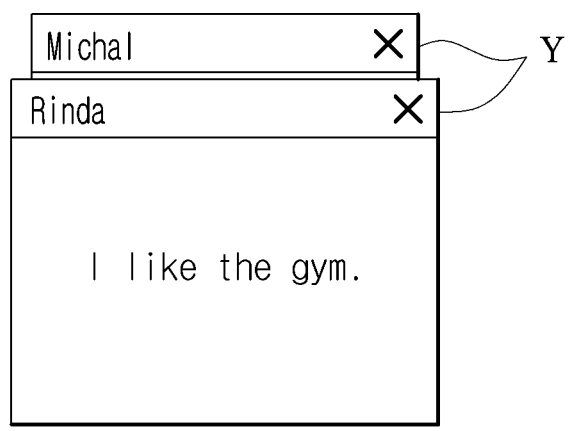

In detail, the user of the first mobile terminal P1 may generate the input information I through the first mobile terminal P1 and also may generate the display condition information which indicates a condition for displaying the input information I as shown in FIG. 5. The first mobile terminal P1 may deliver the display condition information to the augmented reality provision server 10.

As an example, the display condition information may refer to information regarding how to display the input information I entered through the first mobile terminal P1 on the second mobile terminal P2 and/or whether to display the input information on the second mobile terminal P2 or not.

The display condition information will be described in more detail below.

As an example, the display condition information may be information regarding whether to display the input information I on the second mobile terminal P2.

That is, the display condition information may be condition information regarding whether or not the input information I generated from the first mobile terminal P1 is to be displayed even on the second mobile terminal P2.

As an example, the user of the first mobile terminal P1 may generate the display condition information through an input window displayed on the first mobile terminal P1, as shown in FIG. 5.

As an example, the user of the first mobile terminal P1 touching "0" may mean that the display condition information is a condition that allows the input information I to be displayed on the second mobile terminal P2, and the user of the first mobile terminal P1 touching "X" may mean that the display condition information is a condition that does not allow the input information I to be displayed on the second mobile terminal P2.

In this case, in the second augmented reality information transmission step, when the display condition information is the condition that allows the input information I to be displayed on the second mobile terminal P2, the augmented reality provision server 10 may transmit the second augmented reality information A2 to the second mobile terminal P2.

As a result, when the second augmented reality information A2 is received from the augmented reality provision server 10, the second mobile terminal P2 may display the second augmented reality information A2 including the input information I generated from the first mobile terminal P1 to the user.

That is, the second mobile terminal P2 may display the second augmented reality information A2 including the characters "I want someone to exercise together" generated from the first mobile terminal P1 to the user, as shown in FIG. 4.

On the contrary, in the second augmented reality information transmission step, when the display condition information is the condition that does not allow the input information I to be displayed on the second mobile terminal P2, the augmented reality provision server 10 may not transmit the second augmented reality information A2 to the second mobile terminal P2.

As a result, the second mobile terminal P2 may display the first augmented reality information A1 not including the input information I generated from the first mobile terminal P1 to the user.

That is, the second mobile terminal P2 may display the first augmented reality information A1 not including the characters "I want someone to exercise together" generated from the first mobile terminal P1 to the user, as shown in FIG. 3.

For example, as shown in FIG. 5, the display condition information may be a condition on whether to display the input information I on the second mobile terminal P2 depending on the user's age and gender.

For example, when the user of the first mobile terminal P1 touches "teenagers," the display condition information may refer to a condition in which the input information I is displayed only to "teenage" users.

Accordingly, when the user of the second mobile terminal P2 is in 10s, the augmented reality provision server 10 may deliver the second augmented reality information A2 including the input information I to the second mobile terminal P2.

However, when the user of the second mobile terminal P2 is in 20s, the augmented reality provision server 10 may not deliver the second augmented reality information A2 including the input information I to the second mobile terminal P2. As a result, the input information I may not be displayed on the second mobile terminal P2.

For example, when the user of the first mobile terminal P1 touches "women," the display condition information may refer to a condition in which the input information I is displayed only to female users.

Accordingly, when the user of the second mobile terminal P2 is a woman, the augmented reality provision server 10 may deliver the second augmented reality information A2 including the input information I to the second mobile terminal P2.

However, when the user of the second mobile terminal P2 is a man, the augmented reality provision server 10 may not deliver the second augmented reality information A2 including the input information I to the second mobile terminal P2. As a result, the input information I may not be displayed on the second mobile terminal P2.

As an example, the display condition information may be condition information having a plurality of conditions selected.

That is, the user of the first mobile terminal P1 may touch "teenagers" and "women" through the first mobile terminal P1 and thus generate the display condition information having a plurality of pieces of condition information.

As an example, the augmented reality provision server 10 may receive and store information regarding the user of the first mobile terminal P1 and the user of the second mobile terminal P2, for example, user information in advance.

That is, the augmented reality provision server 10 may receive and store information regarding ages, genders, regions, and the like of the users of the first mobile terminal P1 and the second mobile terminal P2.

Also, as an example, the display condition information may be information regarding the display location of the input information I on the second mobile terminal P2.

In detail, the user of the first mobile terminal P1 may determine, through the first mobile terminal P1, at which location in the second augmented reality information A2 the input information I will be displayed.

As shown in FIG. 4, for example, the user of the first mobile terminal P1 may enter the display condition information such that the characters "I want someone to exercise together" are displayed in a lower portion of the augmented reality information "6F Gym" through the first mobile terminal P1 or such that the characters are displayed in an upper portion of the augmented reality information "6F Gym."

When the display condition information is a condition in which the characters "I want someone to exercise together" are displayed in the lower portion of the augmented reality information "6F Gym," the characters "I want someone to exercise together" may be displayed in the lower portion of the augmented reality information "6F Gym" on the second mobile terminal P2, as shown in FIG. 4.

When the display condition information is a condition in which the characters "I want someone to exercise together" are displayed in an upper portion H of the augmented reality information "6F Gym," the characters "I want someone to exercise together" may be displayed in the upper portion H of the augmented reality information "6F Gym" on the second mobile terminal P2.

The augmented reality provision server 10 may be implemented to receive the display condition information from the first mobile terminal P1 and transmit the second augmented reality information A2 including the corresponding input information I to the second mobile terminal P2.

Also, as an example, the display condition information may be information regarding the display order of the input information I on the second mobile terminal P2.

In detail, the user of the first mobile terminal P1 may determine, through the first mobile terminal P1, the display order of the input information I in the relationship between the input information I and other input information Y entered through another mobile terminal P in the second augmented reality information A2.

That is, as shown in FIG. 6B, on the assumption that users (Rinda and Michal) of other mobile terminals P enter input information Y respectively to configure the first augmented reality information A1 before the user of the first mobile terminal P1 sends the input information I to the augmented reality provision server 10, the user of the first mobile terminal P1 may enter the display condition information such that the characters "I want someone to exercise together" are displayed before the other input information Y.

As a result, as shown in FIG. 6A, the second augmented reality information A2 in which the characters "I want someone to exercise together," which indicate the input information I of the first mobile terminal P1, are displayed before the other input information Y may be displayed on the second mobile terminal P2.

The user of the second mobile terminal P2 may sequentially view the input information I and the other input information Y through a touch on a screen as shown in FIG. 6A.

As an example, the user of the first mobile terminal P1 may enter the display condition information through the first mobile terminal P1 such that the input information I is displayed before the other input information Y or such that the input information I is displayed after the other input information Y.

Also, the display condition information may be information regarding the display location of the input information I on the second mobile terminal P2 and the display order of the input information I on the second mobile terminal P2.

That is, the user of the first mobile terminal P1 may select the display location of the input information I. Further, when the other input information Y is present at the location where the input information I is to be displayed, the user may select the display order of the input information I.

Also, the display condition information may be information regarding the display period of the input information I on the second mobile terminal P2.

In detail, the user of the first mobile terminal P1 may determine, through the first mobile terminal P1, how long the input information I will be displayed in the second augmented reality information A2.

When the display period of the input information I is determined to be one day, the input information I may be displayed in the second augmented reality information A2 of the second mobile terminal P2 for one day and may no longer be displayed in the second augmented reality information A2 after one day.

As a result, as shown in FIG. 6A, the characters "I want someone to exercise together," which indicate the input information I of the first mobile terminal P1 may be displayed in the second augmented reality information A2 on the second mobile terminal P2 for one day. After one day, the input information I may not be displayed as shown in FIG. 6B.

Also, the display condition information may be information regarding a display start time of the input information I on the second mobile terminal P2.

In detail, the user of the first mobile terminal P1 may determine, through the first mobile terminal P1, when the input information I will start to be displayed in the second augmented reality information A2.

When the display start time of the input information I is determined to be 1:00 PM tomorrow, the input information I may be displayed in the second augmented reality information A2 of the second mobile terminal P2 from 1:00 PM tomorrow and may not be displayed in the second augmented reality information A2 before 1:00 PM.

As a result, as shown in FIG. 6A, the characters "I want someone to exercise together," which indicate the input information I of the first mobile terminal P1 may be displayed in the second augmented reality information A2 on the second mobile terminal P2 from 1:00 PM tomorrow. Before 1:00 PM tomorrow, the input information I may not be displayed as shown in FIG. 6B.

Another function of the method of the augmented reality provision server providing the augmented reality information to the mobile terminal according to an embodiment of the present invention will be described below with reference to FIGS. 7 to 12.

Here, the redundant description of the method of the augmented reality provision server providing the augmented reality information to the mobile terminal will be simplified or omitted.

Figure 7:
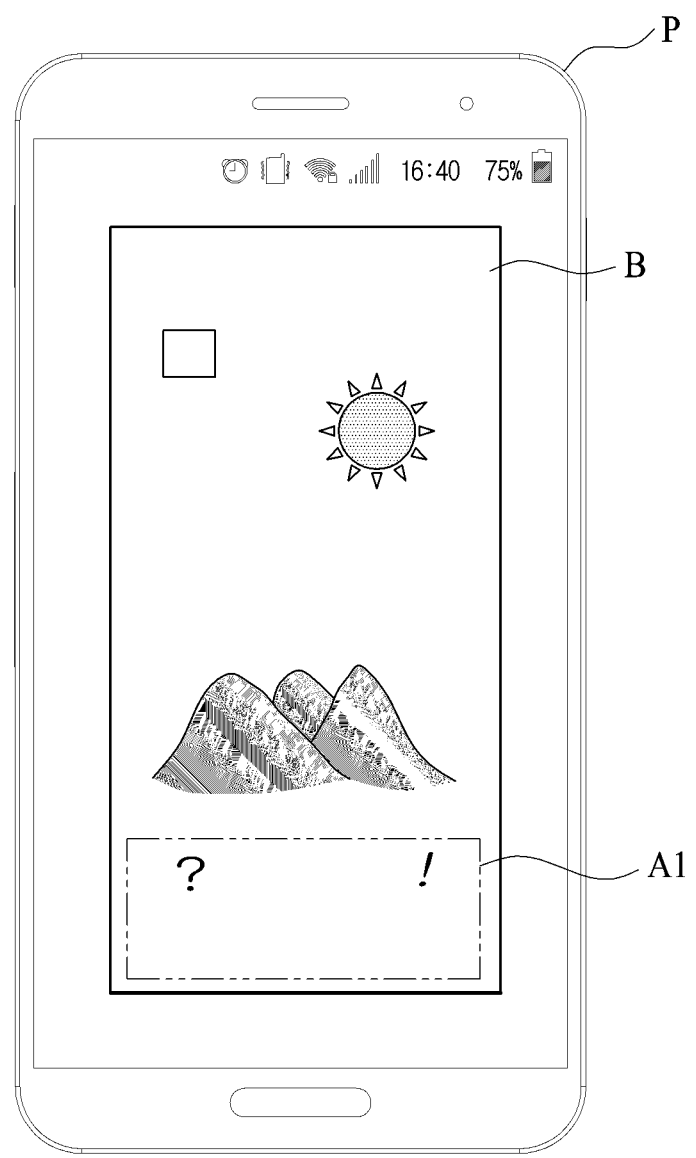

FIG. 7 shows another example in which the first augmented reality information A1 is displayed on the first mobile terminal P1 in the capture information reception step and the first augmented reality information transmission step.

As an example, the first augmented reality information A1 may be information indicating that characters "?" and "!" already entered through the other mobile terminal P are displayed on the building.

Here, the user of the first mobile terminal P1 may deliver predetermined input information I to the augmented reality provision server 10 through the input information reception step and also may deliver predetermined display condition information to the augmented reality provision server 10 through the display condition information reception step.

Here, as an example, the display condition information may refer to information regarding the displaying of the input information I on the first mobile terminal P1.

That is, the display condition information may refer to information regarding how and when the input information I will be displayed on the first mobile terminal P1.

As an example, the display condition information may refer to information regarding the display location of the input information I with respect to the target thing B on the first mobile terminal P1.

In detail, as shown in FIG. 7, while the first augmented reality information A1 is displayed on the first mobile terminal P1, the user of the first mobile terminal P1 may deliver the input information I indicating "♡" to the augmented reality provision server 10 through the first mobile terminal P1.

Figure 8:
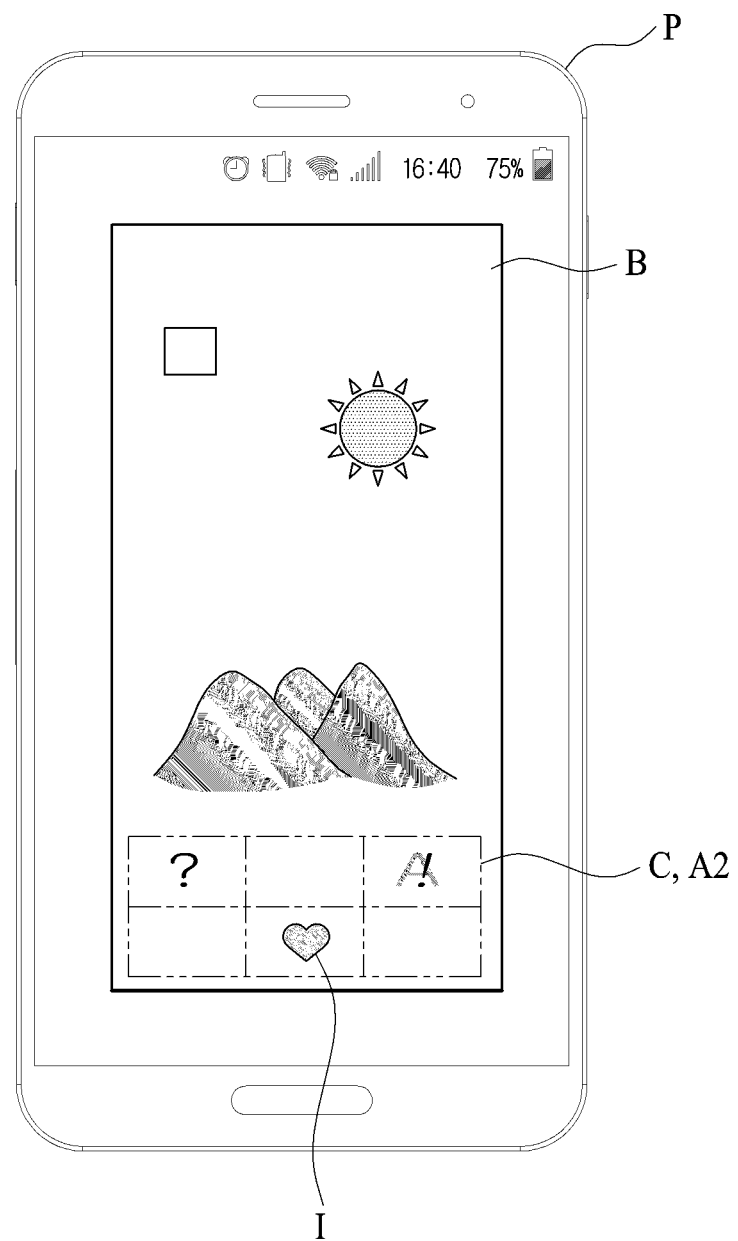

The augmented reality provision server 10 may deliver the second augmented reality information A2 including the input information I to the first mobile terminal P1. As shown in FIG. 8, the first mobile terminal P1 may display the second augmented reality information A2 including the input information I indicating "♡," which is received from the augmented reality provision server 10, to the user of the first mobile terminal P1.

Here, the user of the first mobile terminal P1 may enter, through the first mobile terminal P1, the display condition information regarding at which location the input information I will be displayed in the second augmented reality information A2 and may transmit the display condition information to the augmented reality provision server 10.

However, the condition for the display location of the input information I of the display condition information may be a condition based on the target thing B.

As an example, the display condition information may be a condition in which the input information I indicating "♡" can be displayed only on the target thing B being captured and a condition in which the input information I cannot be displayed in a region outside the target thing B.

Accordingly, the user of the first mobile terminal P1 may allow the input information I indicating "♡" to be displayed not in the region outside the target thing B being captured but only at a predetermined location on the target thing B, other than the region outside the target thing B.

Here, as an example, the first augmented reality information A1 may include displayable information C for a displayable location of the input information I on the basis of the target thing B.

As an example, as shown in FIG. 8, a region C for a location at which the input information I indicating "♡" can be entered may be displayed on the first mobile terminal P1.

As an example, the displayable location of the input information I may be a predetermined location on the target thing B.

As an example, the displayable information C may be represented on the target thing B with dotted lines and may display the displayable region of the input information to the user.

As an example, the input information I indicating "♡" may be displayed in a region other than a region where characters "?" and "!" are already displayed, as shown in FIG. 8, or may be displayed in the region where the characters "?" and "!" are already displayed.

Figure 9:
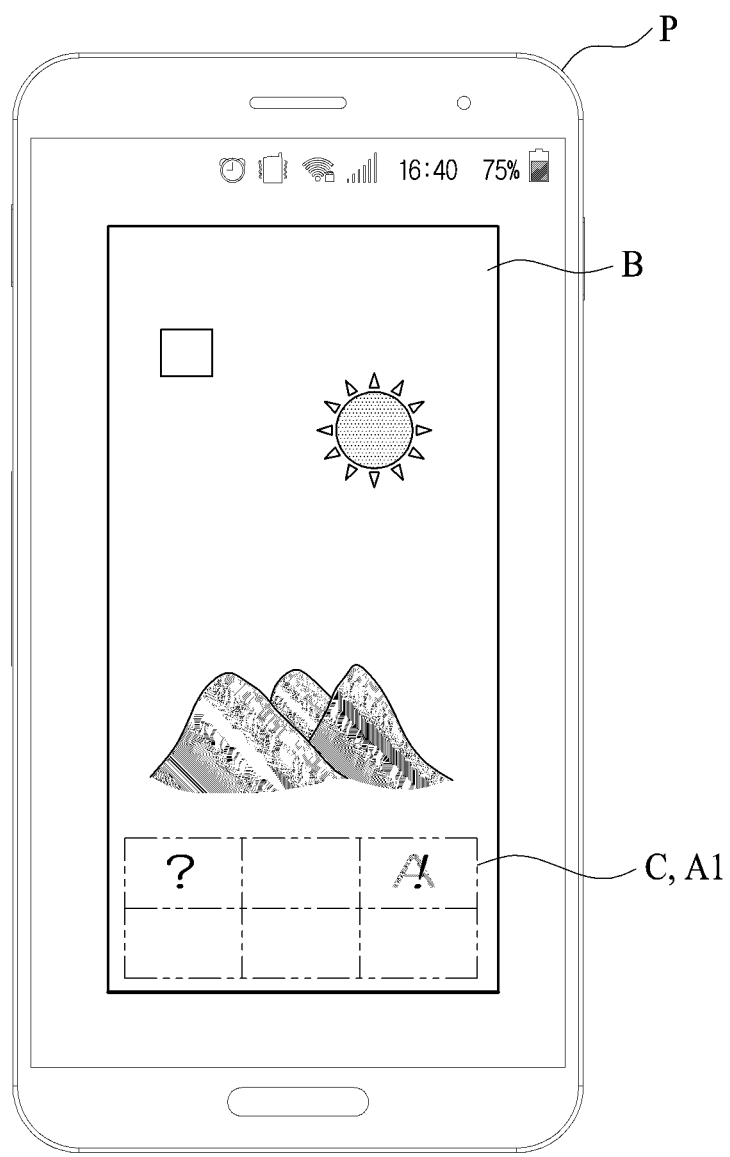

In detail, FIG. 9 shows an example in which the first augmented reality information A1 is displayed on the first mobile terminal P1. Other input information, for example, "?," "!," and "A" may be already displayed by another mobile terminal P.

In particular, the characters "!" and "A" may be displayed to overlap each other.

Here, through the first mobile terminal P1, the user of the first mobile terminal P1 may select a region where "?," "!," and "A" are not displayed and allow the input information I indicating "♡" to be displayed in the region or may select a region where "?," "!," and "A" are displayed and allow the input information I to be displayed in the region.

The user of the first mobile terminal P1 may enter the display condition information such that the input information I indicating "♡" is displayed in a region where "?" is displayed in FIG. 9, and the first mobile terminal P1 may transmit the display condition information to the augmented reality provision server 10.

In this case, the augmented reality provision server 10 may receive the input information I and the display condition information from the first mobile terminal P1 and transmit the corresponding second augmented reality information A2 to the first mobile terminal P1.

In this case, the second augmented reality information A2 may include only the input information I at the display location of the input information I with respect to the target thing B and may include overlap information in which information pieces (e.g., "!" and "A") input by a plurality of mobile terminals P other than the first mobile terminal P1 overlap each other at locations other than the display location of the input information I with respect to the target thing B.

Figure 10:
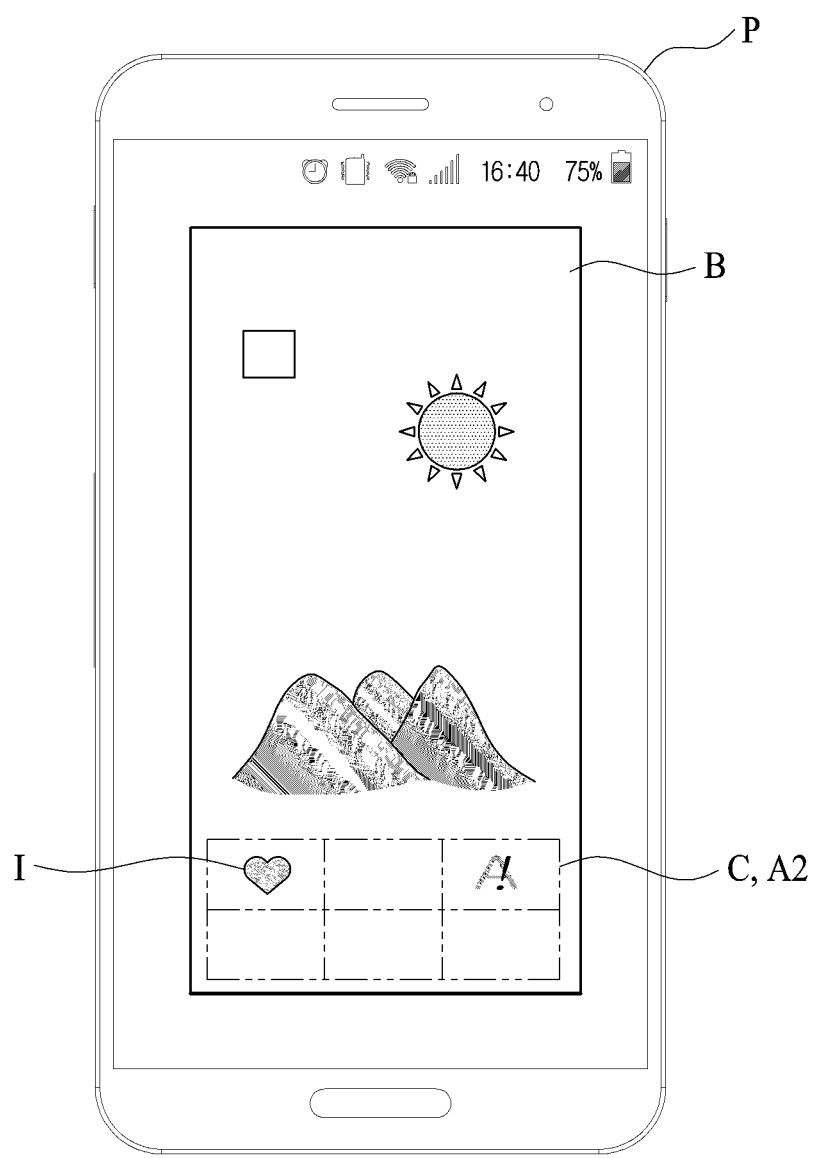

In detail, as shown in FIG. 10, for the second augmented reality information A2 transmitted to the first mobile terminal P1, only "♡," which is the input information I, may be displayed in a region where "?" is displayed and "!" and "A" may be displayed to overlap each other in the other regions like the previous state when the user of the first mobile terminal P1 enters the display condition information such that the input information I indicating "♡" is displayed in the region where "?" is displayed in FIG. 9.

Accordingly, the user of the first mobile terminal P1 who has entered the character "♡," which is the input information I, can relatively clearly view the input information I entered by him or her in comparison with the other input information Y input through the other terminal P.

Figure 11:
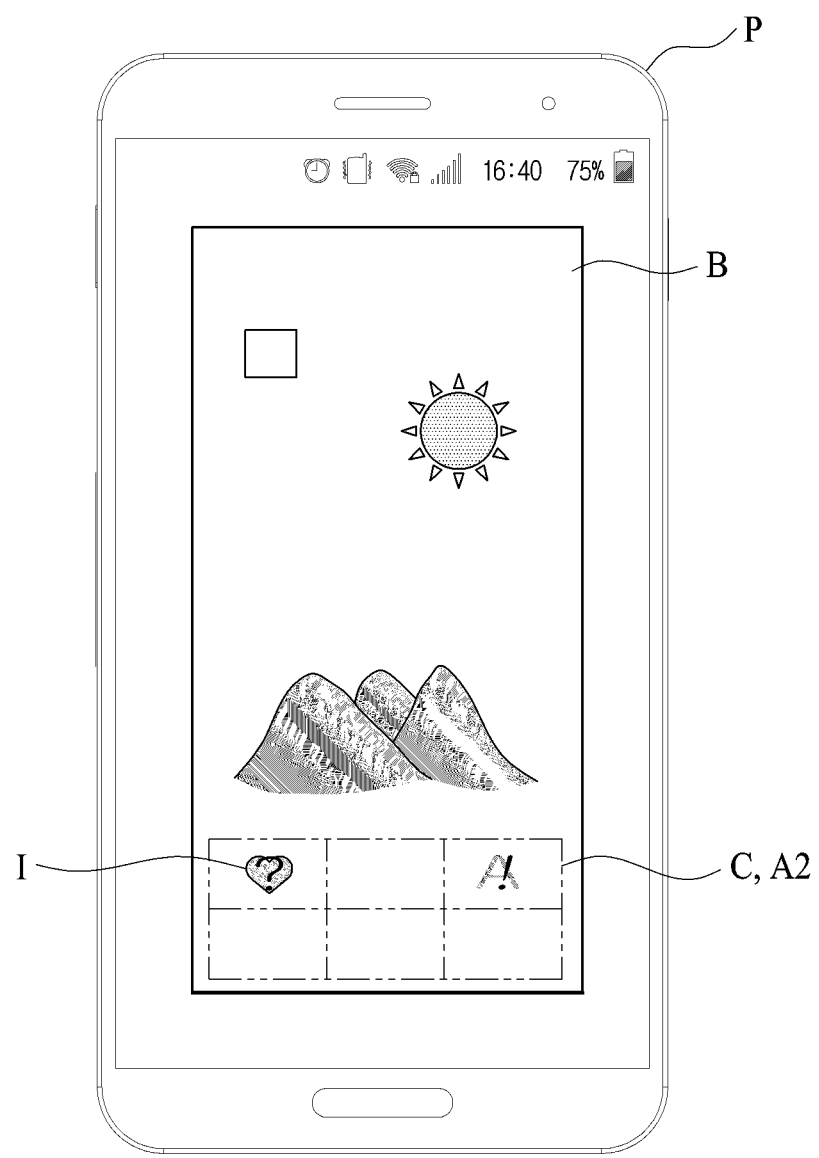

However, for the second augmented reality information A2 displayed by the second mobile terminal P2, "!" and "A" may be displayed to overlap each other, and also "?" and "♡" may be displayed to overlap each other, as shown in FIG. 11.

Here, as an example, the second augmented reality information A2 may be information including the input information I corresponding to a period from a first point of time to a second point of time. In this case, the input information I may be gradually blurred from the first point of time to the second point of time.

Figure 12:
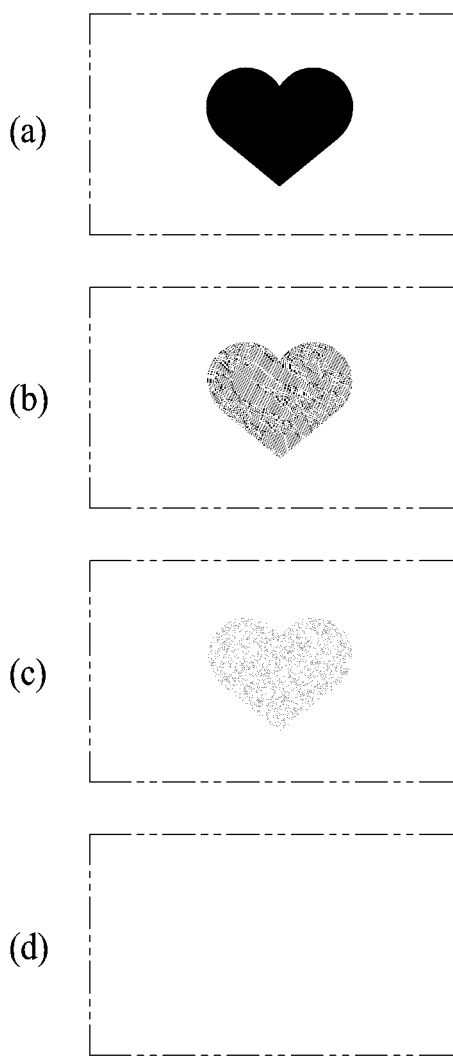

In detail, FIG. 12 shows an enlarged schematic view showing only the character "♡," which is the input information I, among the second augmented reality information A2 displayed by the first mobile terminal P1. As shown in FIG. 12A, the character "♡," which is the input information I, may be included in the second augmented reality information A2 and displayed from the first point of time. As shown in FIGS. 12B and 12C, the character "♡" may be gradually blurred on the second augmented reality information A2 from the first point of time to the second point of time.

Furthermore, as shown in FIG. 12D, the character "♡," which is the input information I, may no longer be included in the second augmented reality information A2 after the second point of time and thus may not be displayed on the first mobile terminal P1 and the second mobile terminal P2.

As an example, the user may select the first point of time and/or the second point of time through the first mobile terminal P1.

The augmented reality provision server 10 that implements the augmented reality information providing method and the mobile terminal P that is provided with the augmented reality information will be described in detail below with reference to FIGS. 25 and 26.

As shown in FIG. 25, for example, the augmented reality provision server 10 may include a reception unit 400 configured to receive predetermined information from the mobile terminal P, a control unit 200 configured to process, compute, select, determine, and/or control data related to augmented reality information on the basis of the predetermined information received by the reception unit 400, a transmission unit 100 configured to deliver predetermined information related to the augmented reality information to the mobile terminal P, and a memory unit 500 configured to store data and/or information necessary to implement the augmented reality information providing method.

As shown in FIG. 26, for example, the mobile terminal P may include a terminal input unit P10 configured to receive predetermined information and/or data related to implementation of augmented reality information by a user's touch or the like, a terminal location generation unit P20 configured to generate information regarding where the mobile terminal P is located, a terminal communication unit P40 configured to receive or deliver the predetermined information and/or data from or to the augmented reality provision server 10, a terminal capture unit P50 configured to capture the predetermined information and/or data related to the augmented reality information, a terminal display unit P30 configured to display the information and/or data related to augmented reality information to the user, and a terminal control unit P60 configured to control elements constituting the mobile terminal P or configured to process, compute, select, and/or determine information and/or data necessary to receive the augmented reality information.

As an example, the augmented reality provision server 10 may include the reception unit 400 configured to receive the capture information L generated by the first mobile terminal P1 and the second mobile terminal P2 capturing the target thing B from the first mobile terminal P1 and the second mobile terminal P2.

As shown in FIG. 2, the first mobile terminal P1 and the second mobile terminal P2 may generate the capture information L through the terminal capture unit P50 and deliver the capture information L to the reception unit 400 through the terminal communication unit P40.

Here, the augmented reality provision server 10 may include the control unit 200 configured to select first augmented reality information A1 corresponding to the capture information L acquired from the reception unit 400 among a plurality of pieces of augmented reality information.

As described above, when the capture information L received from the mobile terminal P corresponds to any one of a plurality of pieces of capture information L previously input to the memory unit 500, the control unit 200 may select the first augmented reality information A1, which is corresponding one of the plurality of pieces of augmented reality information previously input to the memory unit 500.

Here, the selection may mean that any one of the plurality of pieces of previously input augmented reality information is automatically calculated by a previously input program.

Here, the augmented reality provision server 10 may include the transmission unit 100 configured to deliver the first augmented reality information A1 to the first mobile terminal P1 and the second mobile terminal P2.

When the augmented reality information is received through the transmission unit 100, each of the first mobile terminal P1 and the second mobile terminal P2 may display the first augmented reality information A1 to the user through the terminal display.

Here, the reception unit 400 may receive the input information I from the first mobile terminal P1, the control unit 200 may generate the second augmented reality information A2 including the input information I, and the transmission unit 100 may transmit the second augmented reality information A2 to the first mobile terminal P1.

Also, the reception unit 400 may receive the display condition information from the first mobile terminal P1.

Also, when the display condition information is a condition that allows the input information I to be displayed on the second mobile terminal P2, the control unit 200 may transmit the second augmented reality information A2 to the second mobile terminal P2 through the transmission unit 100. When the display condition information is a condition that does not allow the input information I to be displayed on the second mobile terminal P2, the control unit 200 may not transmit the second augmented reality information A2 to the second mobile terminal P2 through the transmission unit 100.

Another function of the method of the augmented reality provision server providing the augmented reality information to the mobile terminal according to an embodiment of the present invention will be described in detail below with reference to FIGS. 13 to 18.

A redundant description of those described above will be simplified or omitted.

The method of the augmented reality provision server providing the augmented reality information to the mobile terminal according to an embodiment of the present invention may include a location information reception step in which the augmented reality provision server 10 receives location information, which is information regarding the location of the mobile terminal P, from the mobile terminal P.

The augmented reality provision server 10 may receive the location information from the mobile terminal P and acquire information regarding at which location the mobile terminal P is present.

Here, the method of the augmented reality provision server providing the augmented reality information to the mobile terminal according to an embodiment of the present invention may further include a capture information reception step in which the augmented reality provision server 10 receives the capture information L generated by the mobile terminal P capturing the target thing B from the mobile terminal P.

That is, the augmented reality provision server 10 may receive the location information from the mobile terminal P. Furthermore, the augmented reality provision server 10 may receive the capture information L generated by the mobile terminal P capturing the target thing B.

Here, as an example, the method of the augmented reality provision server providing the augmented reality information to the mobile terminal according to an embodiment of the present invention may further include a corresponding augmented reality information transmission step in which the augmented reality provision server 10 delivers corresponding augmented reality information among a plurality of pieces of augmented reality information to the mobile terminal P when a predetermined condition is satisfied based on the location information and the capture information L received from the mobile terminal P.

Here, as an example, the predetermined condition may be a condition on whether the location information corresponds to location information previously input to the augmented reality provision server 10 and whether the capture information L corresponds to capture information L previously input to the augmented reality provision server 10.

In detail, when the location information corresponds to any one piece of the previously input location information and the capture information L corresponds to any one of the previously input location information, that is, the predetermined condition is satisfied based on the location information and the capture information L received from the mobile terminal P, the augmented reality provision server 10 may deliver, to the mobile terminal P, the corresponding augmented reality information corresponding to a combination of the location information and the capture information L among the plurality of pieces of augmented reality information stored in the augmented reality provision server 10.

That is, when the corresponding augmented reality information is selected from the plurality of pieces of augmented reality information, the augmented reality provision server 10 may additionally include the location information as well as the capture information L as information used for a basis for the selection.

The mobile terminal P may display the corresponding augmented reality information received from the augmented reality provision server 10 to the user.

Also, as an example, the predetermined condition may be a condition in which first corresponding augmented reality information among the plurality of pieces of augmented reality information is transmitted to the mobile terminal P when the capture information L corresponds to any one of the plurality of pieces of previously input capture information L and the location information corresponds to first location information among the plurality of pieces of previously input location information and in which second corresponding augmented reality information among the plurality of pieces of augmented reality information is transmitted to the mobile terminal P when the capture information L corresponds to any one of the plurality of pieces of previously input capture information L and the location information corresponds to second location information among the plurality of pieces of previously input location information.

Figure 13:
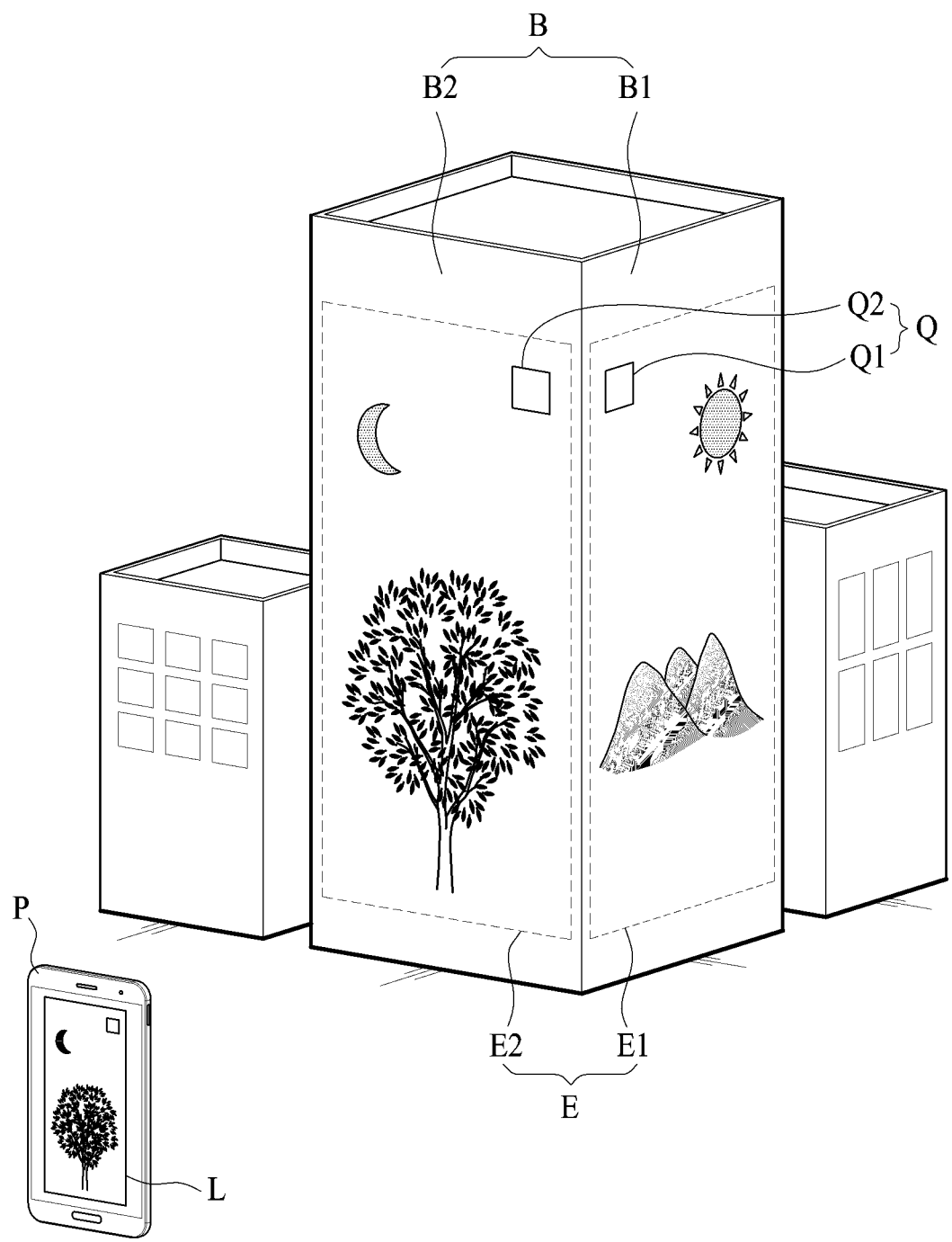
FIGS. 13 to 18 are schematic diagrams illustrating another function of the method of the augmented reality provision server providing the augmented reality information to the mobile terminal according to an embodiment of the present invention.

In detail, for example, as shown in FIGS. 2 and 13, a first identification object Q1, which is one of a plurality of identification objects Q, may be displayed on any one surface B1 of the target thing B, and a second identification object Q2, which is another one of the plurality of identification objects Q, may be displayed on another surface B2 of the target thing B. The first identification object Q1 and the second identification object Q2 may be QR codes Q having the same pattern.

Figure 15:
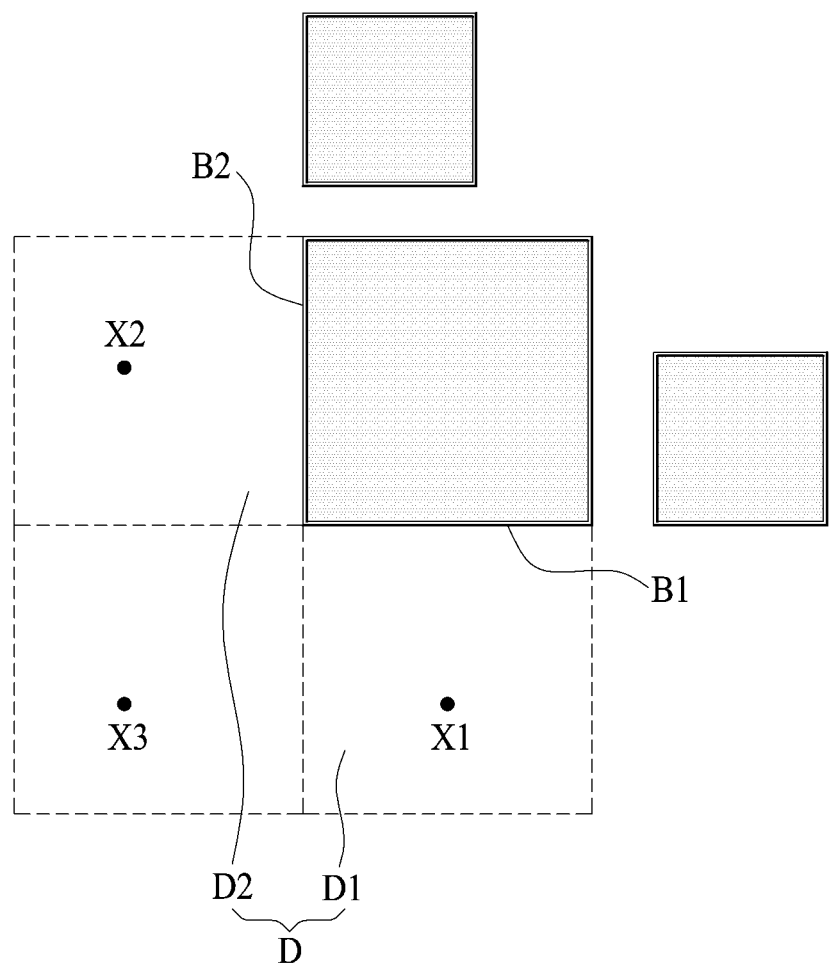

Here, FIG. 15 is a schematic diagram of the target thing B viewed from the top. When the location of the mobile terminal P is a first location X1 with respect to the target thing B and thus the location information corresponds to the first location information D1 as shown in FIGS. 2 and 15, the augmented reality provision server 10 may combine the first identification object Q1 with the location information corresponding to the first location information D1 and transmit the first corresponding augmented reality information A1 (corresponding to the first augmented reality information) among the plurality of pieces of augmented reality information to the mobile terminal P, as shown in FIG. 3.

Figure 14:
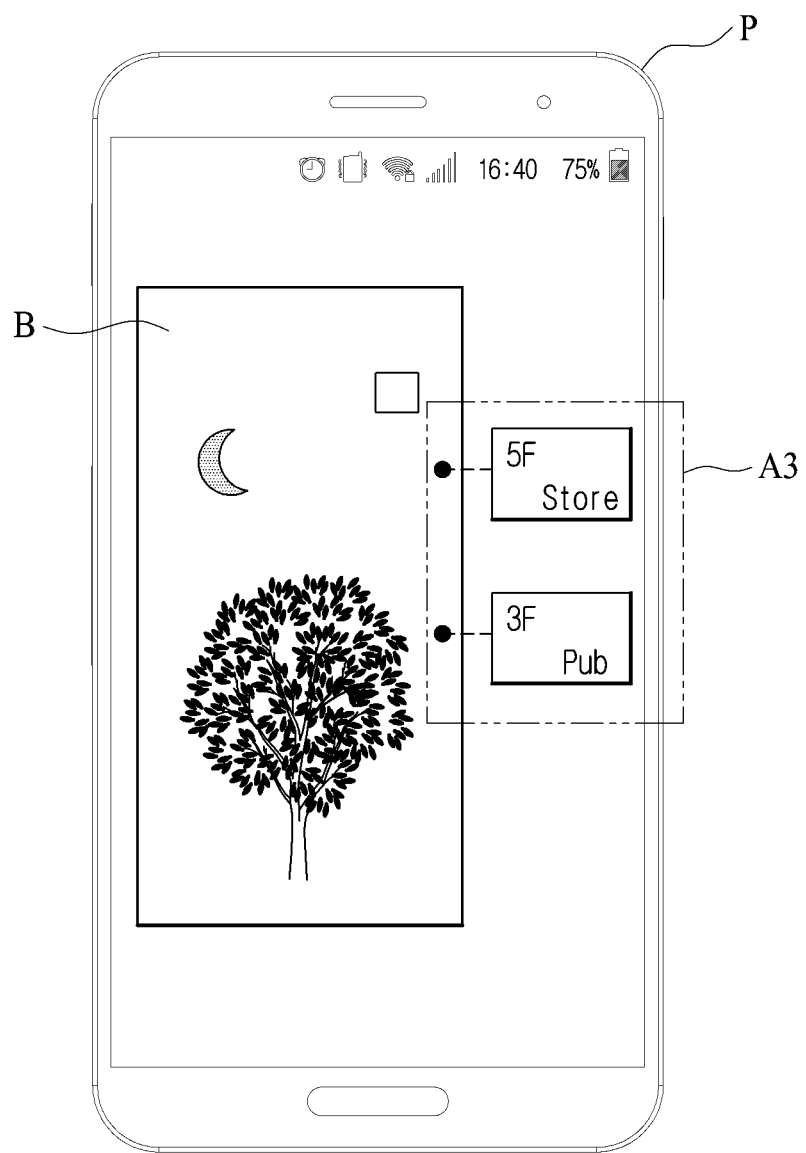

Meanwhile, when the location of the mobile terminal P is a second location X2 with respect to the target thing B and thus the location information corresponds to the second location information D2 as shown in FIGS. 13 and 15, the augmented reality provision server 10 may combine the second identification object Q2 with the location information corresponding to the second location information D2 and transmit the second corresponding augmented reality information A3 different from the first corresponding augmented reality information A1 among the plurality of pieces of augmented reality information to the mobile terminal P, as shown in FIG. 14.

That is, when the location information is different even though the mobile terminal P delivers the capture information L generated by capturing the same identification object to the augmented reality provision server 10, the augmented reality provision server 10 may deliver different pieces of augmented reality information to the mobile terminal P on the basis of the location of the mobile terminal P.

Here, as an example, the location information may be information regarding where the mobile terminal P is located when the capture information L is generated.

Also, as an example, the location information may be generated in association with the generation of the capture information L.

That is, the mobile terminal P may automatically generate the location information when the capture information L is generated.

Here, as an example, the method of the augmented reality provision server providing the augmented reality information to the mobile terminal according to an embodiment of the present invention may further include a locational augmented reality information transmission step in which when the location information does not correspond to the previously input location information, the augmented reality provision server 10 transmits locational augmented reality information based on the location information to the mobile terminal P.

That is, when the location information does not correspond to the previously input location information and thus the predetermined condition is not satisfied, the augmented reality provision server 10 may not transmit the corresponding augmented reality information to the mobile terminal P but may transmit the locational augmented reality information to the mobile terminal P instead.

In detail, as shown in FIG. 15, the augmented reality provision server 10 may store previously input location information D.

The previously input location information D may be information regarding a location where the augmented reality provision server 10 will select the corresponding augmented reality information and transmit the corresponding augmented reality information to the mobile terminal P.

When the location information of the mobile terminal P is determined as being present at the first location X1, which indicates one piece of the previously input location information D, and is determined as being present at the second location X2, which is another piece of the previously input location information D, the augmented reality provision server 10 may transmit the corresponding augmented reality information A1 and A3 to the mobile terminal P on the basis of the predetermined condition.

Figure 16:
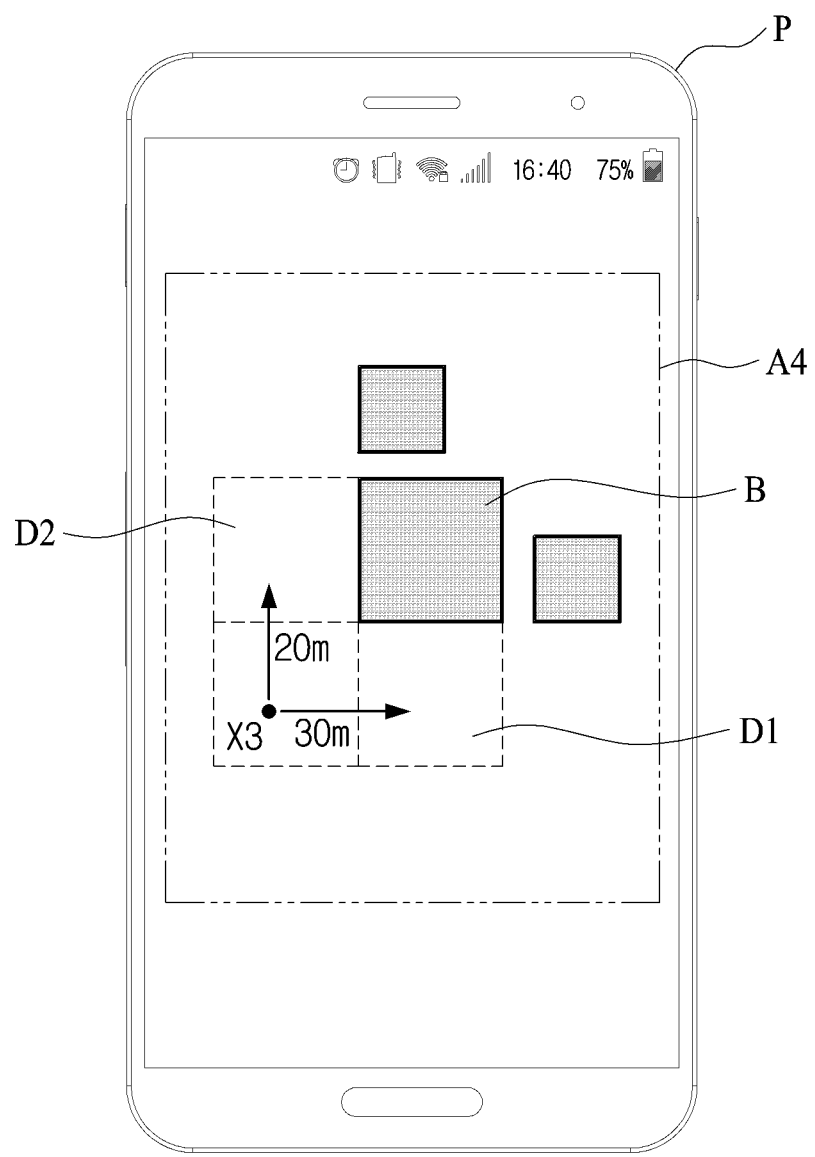

However, as shown in FIG. 15, when the location information of the mobile terminal P is determined as being present at a third location X3 not corresponding to the previously input location information D, the augmented reality provision server 10 may deliver the locational augmented reality information A4 other than the corresponding augmented reality information A1 and A3 shown in FIG. 16 to the mobile terminal P.

As a result, as shown in FIG. 16, the mobile terminal P may display the locational augmented reality information A4 received from the augmented reality provision server 10 to the user.

The locational augmented reality information A4 will be described in detail below.

As an example, the locational augmented reality information A4 may be the location information and information regarding the previously input location information D.

When the user of the mobile terminal P controls the mobile terminal P at the third location X3 of FIG. 15 such that the augmented reality provision server 10 receives the capture information L and the location information from the mobile terminal P, the augmented reality provision server 10 may not select the corresponding augmented reality information A1 and A3 as shown in FIG. 3 or 14 but may select the locational augmented reality information A4 as shown in FIG. 16 and deliver the locational augmented reality information A4 to the mobile terminal P because the location information which indicates the third location X3 does not correspond to the previously input location information D.

As a result, the mobile terminal P may display the locational augmented reality information A4 as shown in FIG. 16.

As shown in FIG. 16, for example, the locational augmented reality information A4 may include the location information which indicates the third location X3 where the mobile terminal P is located and the location information D which is previously input to the augmented reality provision server 10.

As an example, the locational augmented reality information A4 may include the target thing B and may be information indicating a boundary or a regional division between the previously input location information D and location information not previously input by using dotted lines.

As a result, the user of the mobile terminal P may move to a location corresponding to the previously input location information D after viewing the locational augmented reality information A4 through the mobile terminal P.

Also, as an example, the locational augmented reality information A4 may include information regarding a direction and a distance between the location information and the previously input location information D.

As shown in FIG. 16, the locational augmented reality information A4 may be information for displaying, to the augmented reality provision server 10, a distance and a direction to the previously input location information D on the basis of the location information which indicates the third location X3 where the mobile terminal P is located.

As a result, the user of the mobile terminal P may more comfortably move to a location corresponding to the previously input location information D after viewing the locational augmented reality information A4 through the mobile terminal P.

Also, as an example, the locational augmented reality information A4 may include region information F regarding regions in which the number of times the corresponding augmented reality information is transmitted to another plurality of mobile terminals P is large in the location information and the previously input location information D.

Figure 17:
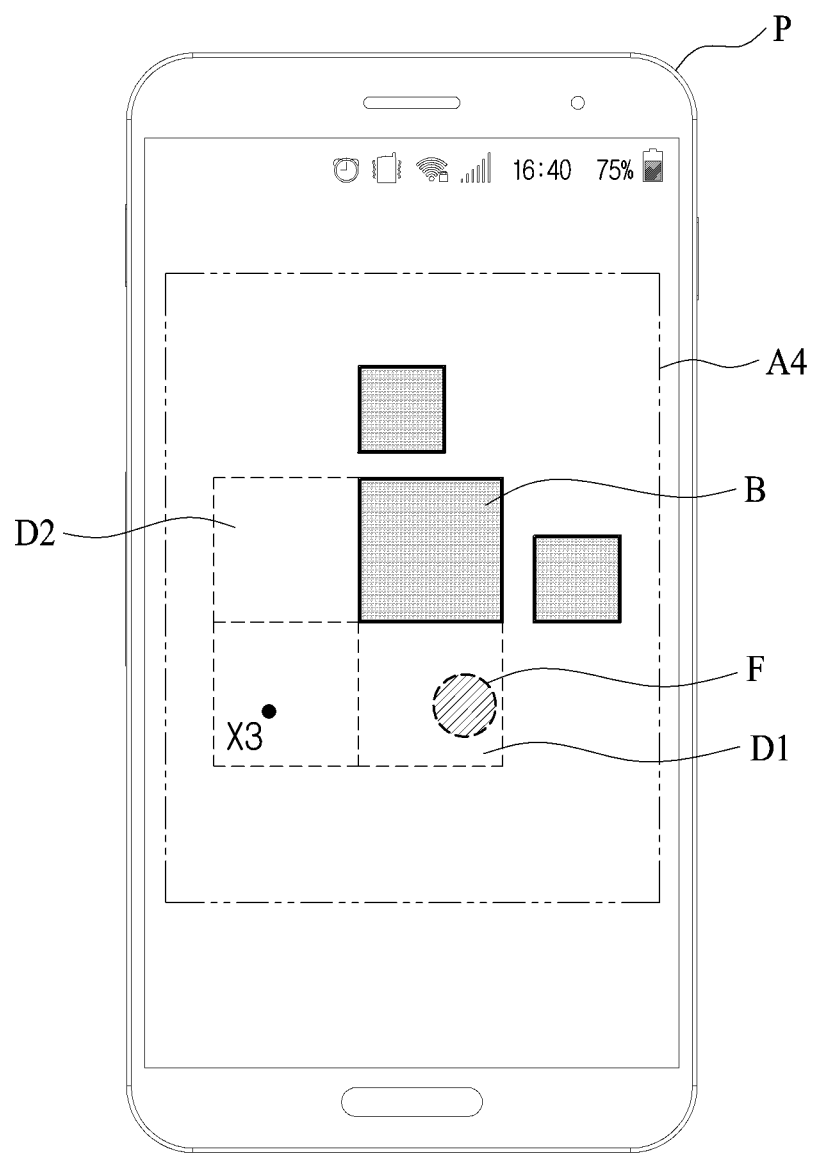

In detail, as shown in FIG. 17, the locational augmented reality information A4 may include the location information, which is the third location X3 where the mobile terminal P is located, and may include the region information F regarding a location having a largest number of pieces of location information received by the augmented reality provision server 10 from the other plurality of mobile terminals P among the previously input location information D.

Accordingly, the user of the mobile terminal P may move to a location where a largest number of people are located and provided with the corresponding augmented reality information A1 and A3 from the augmented reality provision server 10 among the previously input location information D after viewing the locational augmented reality information A4 through the mobile terminal P.

Also, as an example, when there are a plurality of pieces of the previously input location information D, the locational augmented reality information A4 may be information including order information for the plurality of pieces of the previously input location information D.

Figure 18:
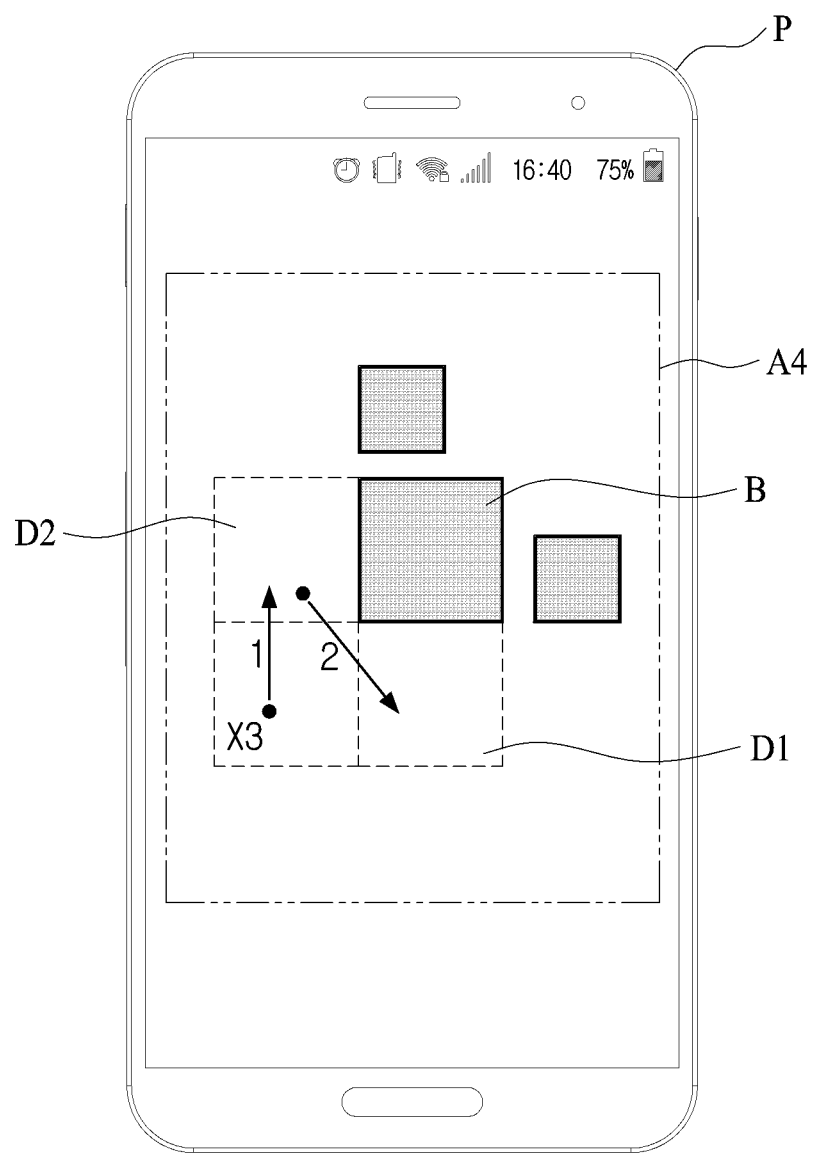

In detail, as shown in FIG. 18, the locational augmented reality information A4 may include the location information which indicates the third location X3 where the mobile terminal P is located. When there are a plurality of pieces of the previously input location information D that includes the first location information D1 and the second location information D2 each corresponding to a location within a predetermined distance from the third location X3, the locational augmented reality information A4 may further include the order information regarding from which of the first location information D1 and the second location information D2 the user will be guided.

As an example, the order information may be information that is displayed with an arrow and a number on the basis of the location information which indicates the third location X3. As shown in FIG. 18, the order information may be information including an arrow and number for guiding the user to the second location information D2 first and then to the first location information D1.

Here, as an example, the order information may be determined by distances between the location information and the plurality of pieces of the previously input location information D.

When on the basis of the location information which indicates the third location X3, the distance to the first location information D1 is 30 m and the distance to the second location information D2 is 20 m as shown in FIG. 16, the order information may be information including an arrow and number for guiding the user to the second location information D2 first and then to the first location information D1, as shown in FIG. 18.

Also, as an example, the order information may be determined by the number to times the corresponding augmented reality information A1 and A3 are transmitted.

In detail, the order information may be information inducing an arrow and number for guiding the user to the first location information D1 first and then to the second location information D2 when the number times corresponding to the first location information D1 is greater than the number of times corresponding to the second location information D2 among the location information received by the augmented reality provision server 10 from a plurality of other mobile terminals P, that is, when the number of times the augmented reality provision server 10 selects the first corresponding augmented reality information A1 corresponding to the first location information D1 is greater than the number of times the augmented reality provision server 10 selects the second corresponding augmented reality information A3 corresponding to the second location information D2 before the mobile terminal P receives the locational augmented reality information A4 from the augmented reality provision server 10.

Also, as an example, the augmented reality provision server 10 may receive the location information of the mobile terminal P periodically as well as when the augmented reality provision server 10 receives the capture information L from the mobile terminal P.

Here, as an example, in the location information reception step, a period in which the augmented reality provision server 10 receives the location information from the mobile terminal P is shorter when the location information does not correspond to the previously input location information D than when the location information corresponds to the previously input location information D.

As a result, when the mobile terminal P is determined as being present at the third location X3 not corresponding to the previously input location information D, the augmented reality provision server 10 may receive the location information from the mobile terminal P in a shorter period, more accurately update the locational augmented reality information A4, and transmit the updated locational augmented reality information A4 to the mobile terminal P.

The augmented reality provision server 10 that implements the augmented reality information providing method and the mobile terminal P that is provided with the augmented reality information will be described in detail below with reference to FIGS. 25 and 26.

As shown in FIG. 25, for example, the augmented reality provision server 10 may include a reception unit 400 configured to receive predetermined information from the mobile terminal P, a control unit 200 configured to process, compute, select, determine, and/or control data related to augmented reality information on the basis of the predetermined information received by the reception unit 400, a transmission unit 100 configured to deliver predetermined information related to the augmented reality information to the mobile terminal P, and a memory unit 500 configured to store data and/or information necessary to implement the augmented reality information providing method.

As shown in FIG. 26, for example, the mobile terminal P may include a terminal input unit P10 configured to receive predetermined information and/or data related to implementation of augmented reality information by a user's touch or the like, a terminal location generation unit P20 configured to generate information regarding where the mobile terminal P is located, a terminal communication unit P40 configured to receive or deliver the predetermined information and/or data from or to the augmented reality provision server 10, a terminal capture unit P50 configured to capture the predetermined information and/or data related to the augmented reality information, a terminal display unit P30 configured to display the information and/or data related to the augmented reality information to the user, and a terminal control unit P60 configured to control elements constituting the mobile terminal P or configured to process, compute, select, and/or determine information and/or data necessary to receive the augmented reality information.

As an example, the augmented reality provision server 10 may include the reception unit 400 configured to receive the location information which is information regarding where the mobile terminal P is located and the capture information L which is generated by the mobile terminal P capturing the target thing B from the mobile terminal P.

As shown in FIG. 2, the mobile terminal P may generate the capture information L through the terminal capture unit P50 and also may generate the location information through the terminal location generation unit P20. The mobile terminal P may deliver the capture information L and the location information to the reception unit 400 through the terminal communication unit P40.

As an example, the terminal location generation unit P20 may be a Global Positioning System (GPS) communication apparatus.

Here, the augmented reality provision server 10 may include the control unit 200 configured to select the corresponding augmented reality information when the predetermined condition is satisfied on the basis of the location information and the capture information L acquired from the reception unit 400 among a plurality of pieces of augmented reality information.

As described above, the control unit 200 may select the corresponding augmented reality information from among a plurality of pieces of augmented reality information previously input to the memory unit 500 when the predetermined condition is satisfied depending on whether the capture information L received from the mobile terminal P corresponds to any one of the plurality of pieces of capture information L previously input to the memory unit 500 and whether the location information received from the mobile terminal P corresponds to any one of the plurality of pieces of location information previously input to the memory unit 500.

Here, the selection may mean that any one of the plurality of pieces of previously input augmented reality information is automatically calculated by a previously input program, and the previously input condition may also be previously input to the memory unit 500 in the form of a program.

Here, the augmented reality provision server 10 may include the transmission unit 100 configured to deliver the corresponding augmented reality information to the mobile terminal P.

When the augmented reality information is delivered through the transmission unit 100, the mobile terminal P may display the augmented reality information to the user through the terminal display unit P30.

When the location information does not correspond to the previously input location information D, the control unit 200 may transmit the locational augmented reality information A4 to the mobile terminal P through the transmission unit 100 on the basis of the location information.

Also, as an example, the augmented reality provision server 10 may transmit different augmented reality information to the terminal P in the order in which the terminal P transmits the capture information L to the augmented reality provision server 10.

In detail, as an example, when the terminal P transmits the capture information L having the first identification object Q1, which is one of the plurality of identification objects Q, displayed on any one surface B1 of the target thing B to the augmented reality provision server 10, the augmented reality provision server 10 may transmit augmented reality information including information A, information B, and information C corresponding to the first identification object Q1 to the terminal P.

On the other hand, when the terminal P transmits the capture information L having the second identification object Q2, which is another one of the plurality of identification objects Q, displayed on another surface B2 of the target thing B to the augmented reality provision server 10, the augmented reality provision server 10 may transmit augmented reality information including information C, information D, and information E corresponding to the second identification object Q2 to the terminal P.

Here, the terminal P may transmit the capture information L having the first identification object Q1, which is one of the plurality of identification objects Q, displayed on any one surface B1 of the target thing B to the augmented reality provision server 10 first, receive the augmented reality information including information A, information B, and information C from the augmented reality provision server 10, and then transmit the capture information L having the second identification object Q2, which is another one of the plurality of identification objects Q, displayed on another surface B2 of the target thing B to the augmented reality provision server 10. In this case, the augmented reality provision server 10 may not transmit the augmented reality information including information C, information D, and information E corresponding to the second identification object Q2 to the terminal P but may transmit augmented reality information including information D and information E or augmented reality information including information F to the terminal P.

That is, the augmented reality provision server 10 may transmit different augmented reality information to the terminal P in the order of the capture information L being transmitted from the terminal P.

Another function of the method of the augmented reality provision server providing the augmented reality information to the mobile terminal according to an embodiment of the present invention will be described in detail below with reference to FIGS. 19 to 24.

A redundant description of those described above will be simplified or omitted.

As shown in FIGS. 19 to 24, the method of the augmented reality provision server providing the augmented reality information to the mobile terminal according to an embodiment of the present invention may relate to a method of providing augmented reality information to the mobile terminal P in association with an image E drawn on the target thing B in a predetermined work order.

As an example, the image E may be drawn by a machine or a person on the target thing B in the work order.

As an example, the target thing B may be an apartment building, and the image E may be a wall painting drawn on the apartment building.

As an example, the image E may be drawn on the wall of the apartment building in the work order from top to bottom.

The augmented reality provision server 10 may prestore information indicating that the image E is actually being drawn on the target thing B in the work order.

Here, the augmented reality information providing method may include a capture information reception step in which the augmented reality provision server 10 receives the capture information L generated by the mobile terminal P capturing the target thing B from the mobile terminal P.

As an example, the mobile terminal P may capture the target thing B on which the image E is drawn and may deliver the capture information L to the augmented reality provision server 10.

Here, the augmented reality information providing method may further include an augmented reality information transmission step in which the augmented reality provision server 10 selects augmented reality information corresponding to the capture information L received from the mobile terminal P and transmits the selected augmented reality information to the mobile terminal P.

That is, the augmented reality provision server 10 may compare the capture information L with a plurality of pieces of previously input capture information L. When the capture information L corresponds to any one of the plurality of pieces of previously input capture information L, the augmented reality provision server 10 may deliver the corresponding one of the plurality of pieces of previously input capture information L to the mobile terminal P.

Figure 19:
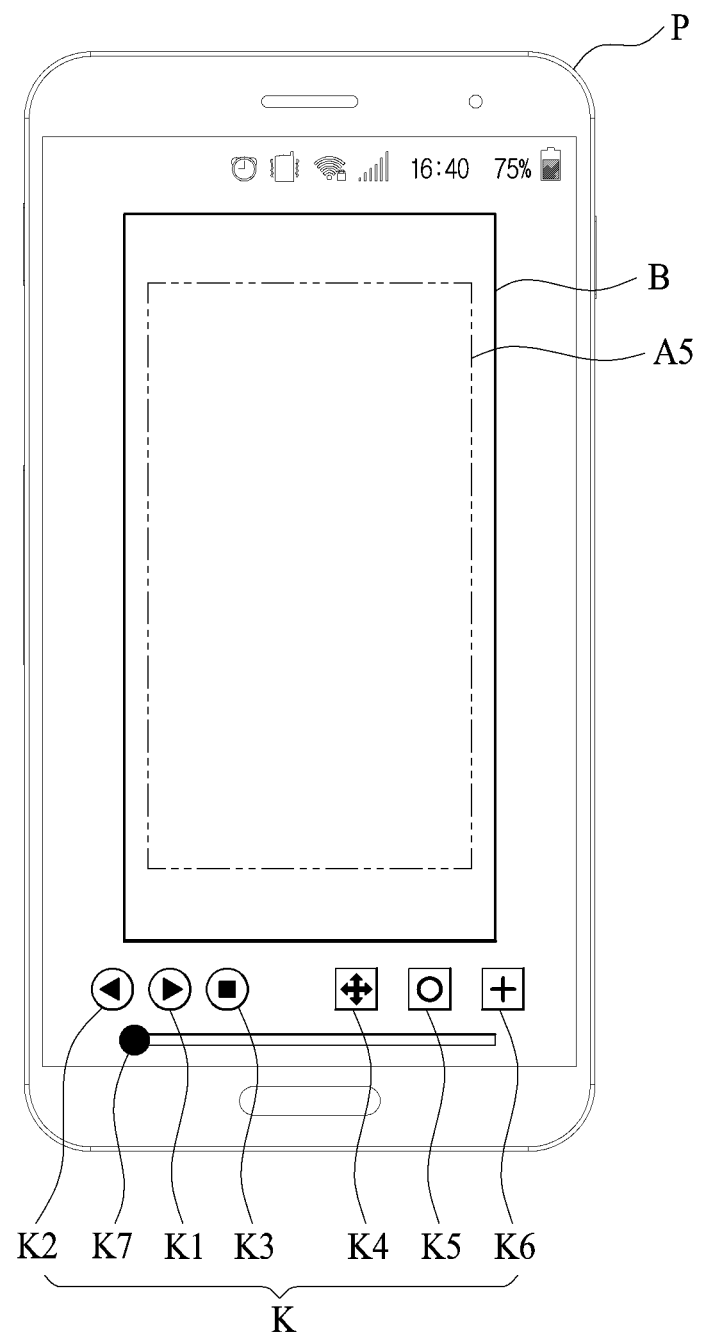
FIGS. 19 to 24 are schematic diagrams illustrating still another function of the method of the augmented reality provision server providing the augmented reality information to the mobile terminal according to an embodiment of the present invention.

FIG. 19 shows an example of the augmented reality information A5. When the user of the mobile terminal P captures the target thing B and sends the capture information L to the augmented reality provision server 10 as shown in FIG. 2, the augmented reality information A5 in which the wall painting is not drawn on the target thing B may be transmitted to the mobile terminal P as shown in FIG. 19.

As a result, the target thing B on which the image E is not displayed, that is, on which the image E is not yet drawn may be displayed on a screen of the mobile terminal P.

Here, as an example, the augmented reality information providing method may further include an input information reception step in which the augmented reality provision server 10 receives, from the mobile terminal P, input information generated by the mobile terminal P receiving an input from the user.

In detail, as an example, a plurality of icons K capable of receiving the input information may be displayed on the mobile terminal P on which the augmented reality information A5 is displayed.

As an example, the input information may be information regarding a method of displaying the image E on the target thing B in the mobile terminal P, and the plurality of icons K may be an input window that allows the user to select a method of displaying the image E on the target thing B.

Here, when the user touches and/or selects at least one of the plurality of icons K, the input information may be generated, and the mobile terminal P may deliver the input information to the augmented reality provision server 10.

Here, as an example, the augmented reality information providing method may further include a corresponding augmented reality information transmission step in which the augmented reality provision server 10 transmits, to the mobile terminal P, corresponding augmented reality information corresponding to the input information received from the mobile terminal P.

In detail, as an example, when the augmented reality provision server 10 receives the input information from the mobile terminal P, the augmented reality provision server 10 may transmit the corresponding augmented reality information corresponding to the input information to the mobile terminal P.

As an example, the corresponding augmented reality information may be information in which the image E is being drawn on the target thing B in a display method corresponding to the input information.

As an example, the mobile terminal P may display the corresponding augmented reality information received from the augmented reality provision server 10 to the user.

Embodiments of the input information and the corresponding augmented reality information will be described in detail below.

As an example, the input information may include information allowing the image E to be displayed on the target thing B in the mobile terminal P in the work order. In this case, the corresponding augmented reality information may include information in which the image E is being drawn on the target thing B in the work order.

In detail, as shown in FIG. 19, when the user touches a first icon K1 allowing the image E to be displayed on the target thing B in the work order to generate the input information while the augmented reality information A5 in which no wall painting is drawn on the target thing B is displayed on the mobile terminal P through the augmented reality information transmission step, the augmented reality provision server 10 may transmit the corresponding augmented reality information corresponding to the input information to the mobile terminal P through the input information reception step and the corresponding augmented reality information transmission step.

Figure 20:
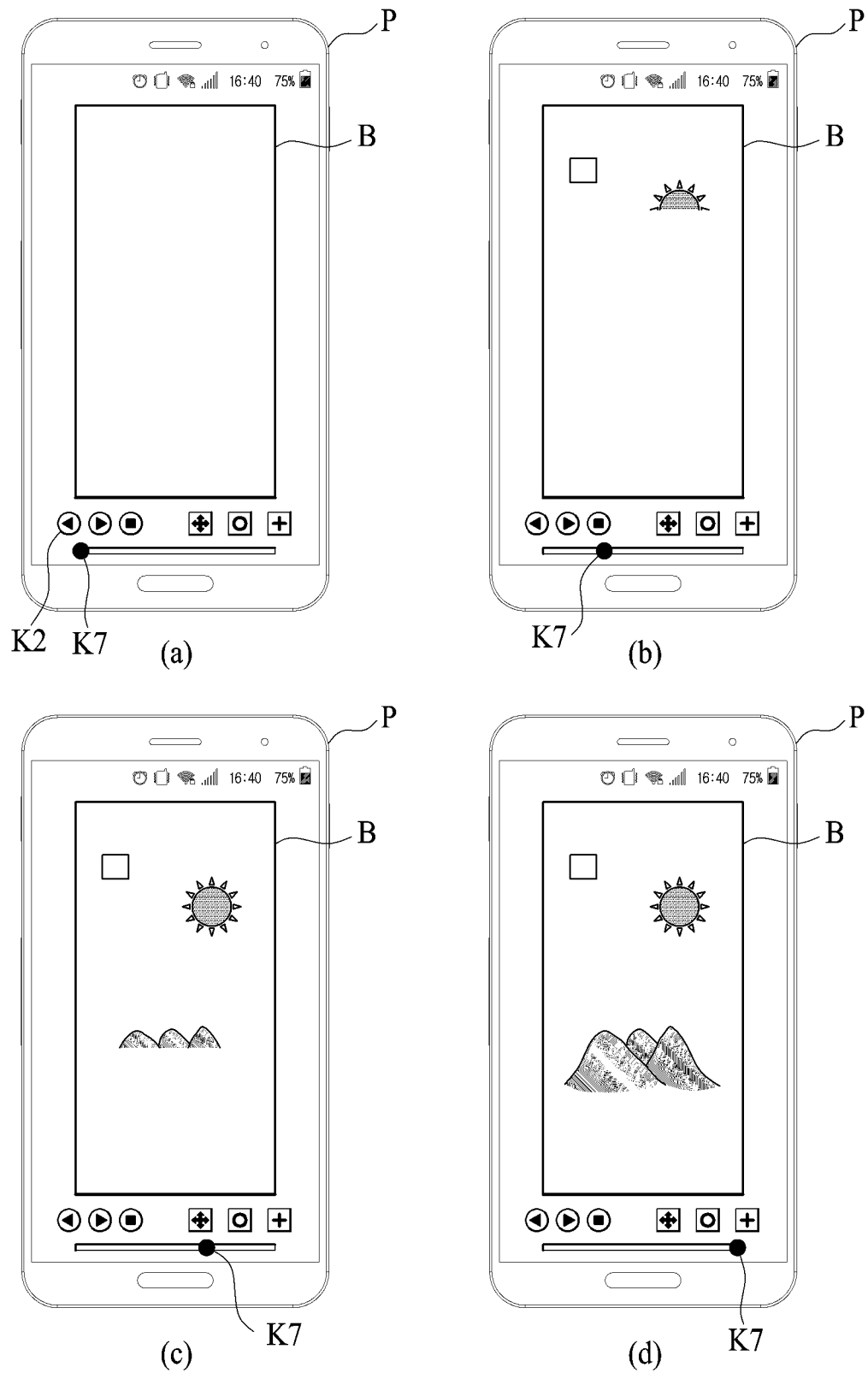

FIG. 20 shows an example of the corresponding augmented reality information in which the image E is being drawn on the target thing B in the mobile terminal P in the work order, i.e., from top to bottom according to the input information.

Referring to FIGS. 20A, 20B, 20C, and 20D in sequence, the corresponding augmented reality information may include information in which the image E is being sequentially drawn on the target thing B in the work order.

As an example, the user may generate the input information such that the image E is erased from the target thing B in the reverse order to that in which the image E is being drawn on the target thing B by touching a second icon K2 among the icons K displayed on the mobile terminal P.

Also, as an example, the user may stop playing the corresponding augmented reality information in which the image E is being drawn on the target thing B by touching a third icon K3 among the icons K displayed on the mobile terminal P.

Also, as an example, the user may adjust the degree to which the image E is being drawn on the target thing B by manipulating a seventh icon K among the icons K displayed on the mobile terminal P.

As an example, the input information may include information regarding a direction in which the user touches the mobile terminal P. In this case, the corresponding augmented reality information may include information in which the image E is being drawn on the target thing B in the touch direction.

In detail, as shown in FIG. 19, when the user touches a fourth icon K4 allowing the image E to be displayed on the target thing B in the touch direction and then consecutively touches the mobile terminal P in a predetermined direction to generate the input information while the augmented reality information A5 in which no wall painting is drawn on the target thing B is displayed on the mobile terminal P through the augmented reality information transmission step, the augmented reality provision server 10 may transmit the corresponding augmented reality information corresponding to the input information to the mobile terminal P through the input information reception step and the corresponding augmented reality information transmission step.

Figure 21:
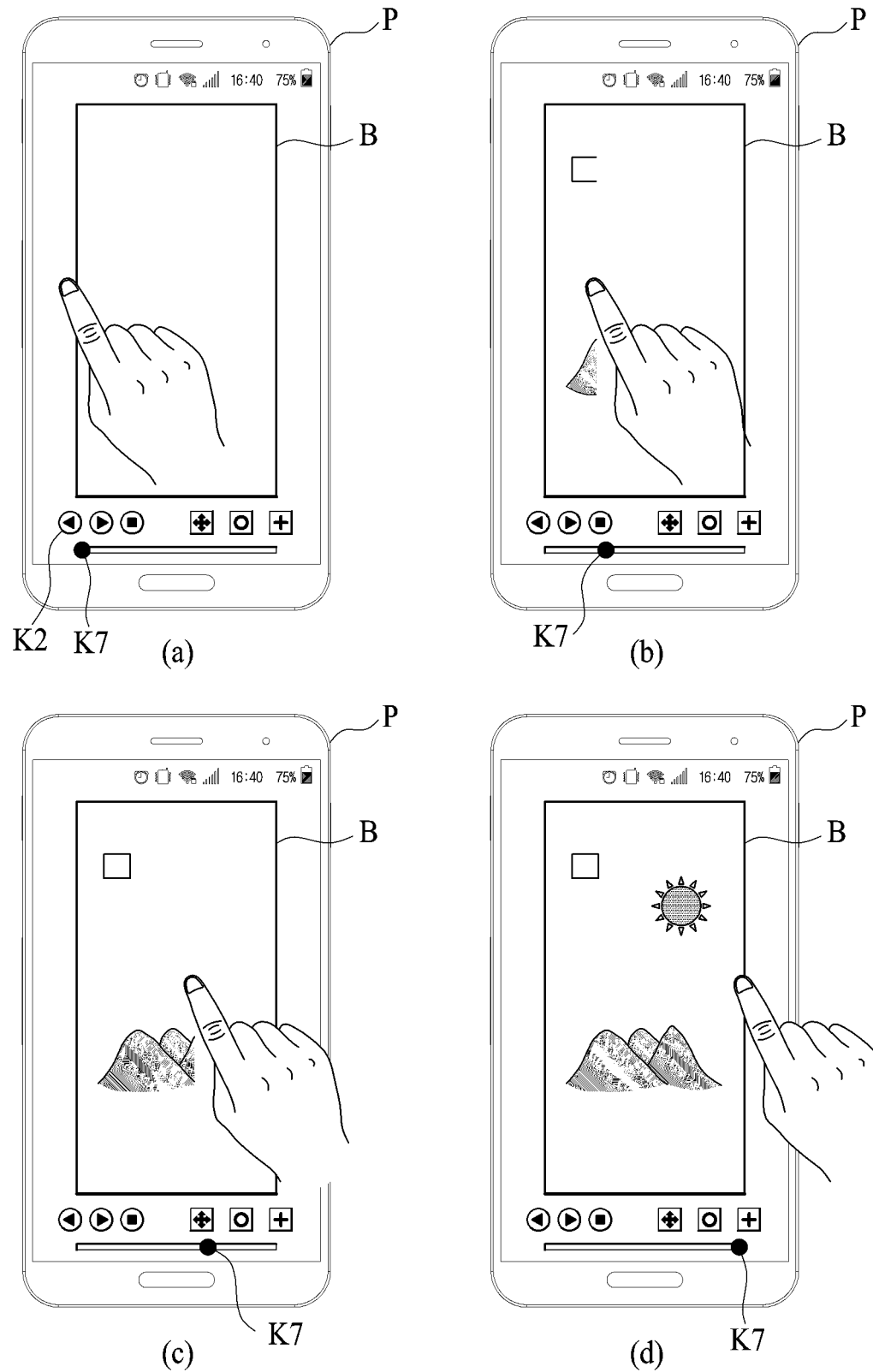

FIG. 21 shows an example of the corresponding augmented reality information in which the image E is being drawn on the target thing B in the mobile terminal P in the touch direction according to the input information.

As an example, referring to FIGS. 21A, 21B, 21C, and 21D in sequence, the corresponding augmented reality information includes information in which the image E is being sequentially drawn on the target thing B in the touch direction when the user touches the mobile terminal P from left to right.

Although not shown, when the user touches the mobile terminal P from right to left, the corresponding augmented reality information may include information in which the image E is being drawn on the target thing B from right to left.

Also, the user may touch the mobile terminal P from bottom to top, from top to bottom, or diagonally, and the corresponding augmented reality information may include information in which the image E is being drawn on the target thing B in a touch direction corresponding to the input information.

As an example, the input information may include information regarding a point at which the user touches the mobile terminal P. In this case, the corresponding augmented reality information may include information in which the image E is being drawn at a predetermined region corresponding to the touch point on the target thing B.

In detail, as shown in FIG. 19, when the user touches a fifth icon K5 allowing the image E to be displayed at a point corresponding to the touch point on the target thing B as a region having a predetermined area and touches a predetermined point of the mobile terminal P to generate the input information while the augmented reality information A5 in which no wall painting is drawn on the target thing B is displayed on the mobile terminal P through the augmented reality information transmission step, the augmented reality provision server 10 may transmit the corresponding augmented reality information corresponding to the input information to the mobile terminal P through the input information reception step and the corresponding augmented reality information transmission step.

Figure 22:
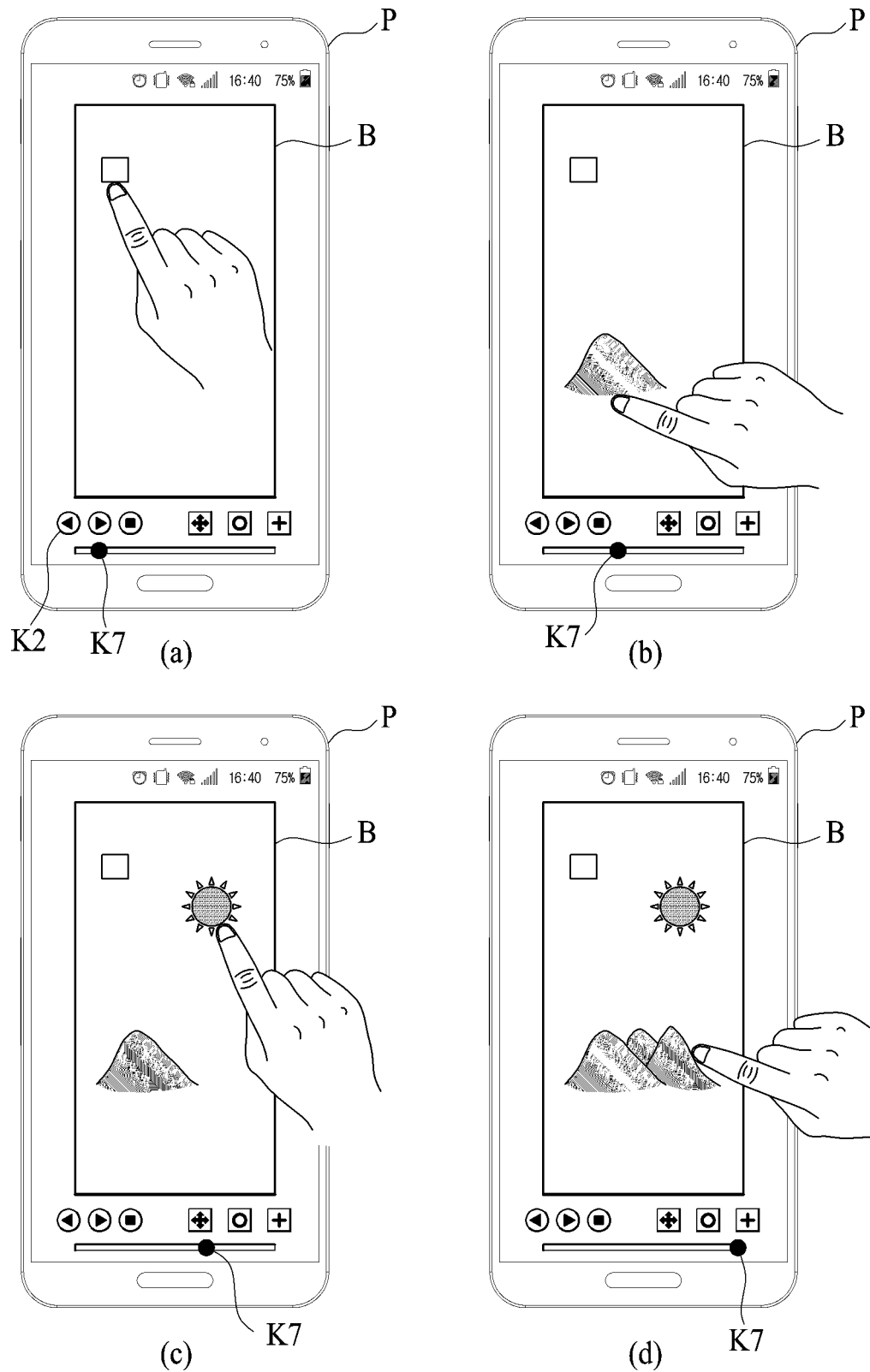
Figure 23:
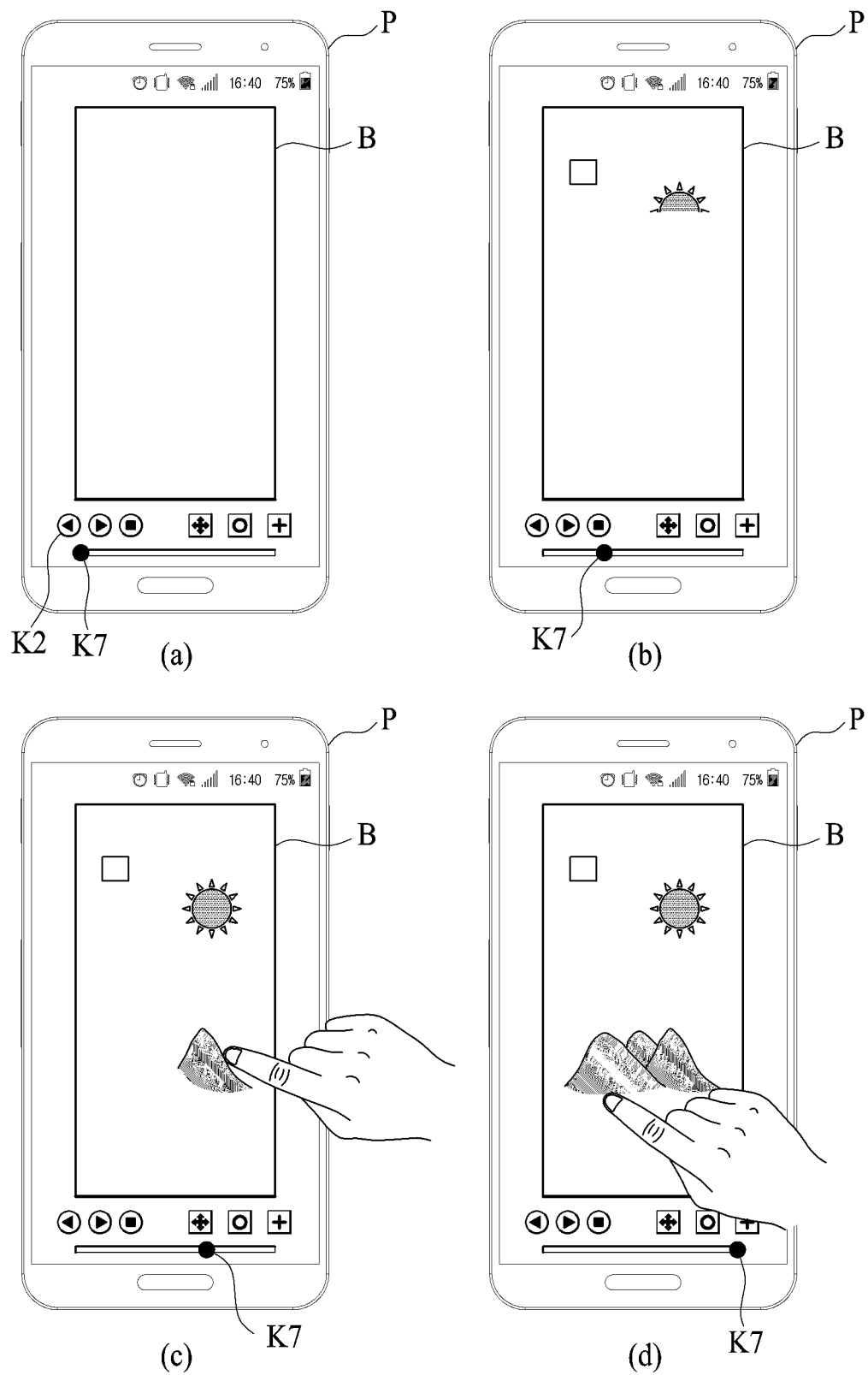
Figure 24:
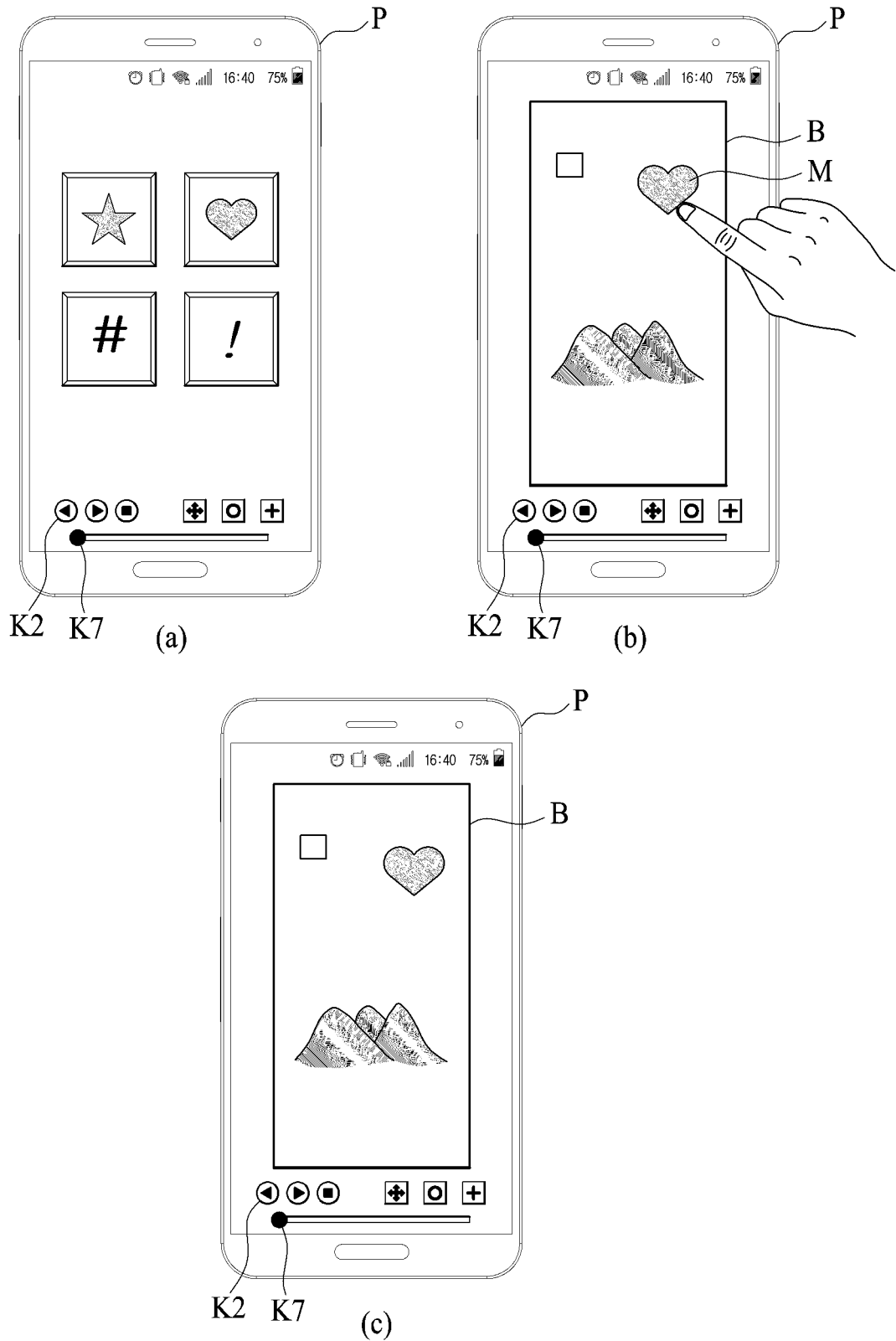

FIG. 22 shows an example of the corresponding augmented reality information in which the image E is being drawn in a predetermined region corresponding to the touch point on the target thing B in the mobile terminal P according to the input information.

As an example, as shown in FIG. 22A, when the user touches an upper left side of the mobile terminal P, the corresponding augmented reality information may have information in which a portion of the image E corresponding to the touch point is being drawn in a region having a predetermined area on the basis of the touch point.

In this state, as shown in FIG. 22B, when the user touches a lower left side of the mobile terminal P, the corresponding augmented reality information may have information in which a portion of the image E corresponding to the touch point is being further drawn in a region having a predetermined area on the basis of the touch point.

Furthermore, as shown in FIGS. 22C and 22D, when the user touches another part of the mobile terminal P, the corresponding augmented reality information may have information in which the remaining portion of the image E corresponding to the touch point is being further drawn in a region having a predetermined area on the basis of the touch point.

Also, as an example, the input information may include information allowing the image E to be displayed on the target thing B in the mobile terminal P in the work order and information regarding the point at which the user touches the mobile terminal P. In this case, the corresponding augmented reality information may include information in which a portion of the image E is being drawn on the target thing B in the work order and information in which a region corresponding to the touch point of another portion of the image E is being drawn.

In detail, as shown in FIG. 19, when the user touches the first icon K1 to generate the input information while the augmented reality information A5 in which no wall painting is drawn on the target thing B is displayed on the mobile terminal P through the augmented reality information transmission step, the augmented reality provision server 10 may transmit the corresponding augmented reality information corresponding to the input information to the mobile terminal P through the input information reception step and the corresponding augmented reality information transmission step.

As a result, as shown in FIGS. 23A and 23B, the image E in the corresponding augmented reality information may be drawn on the target thing B according to the work order.

Here, when the user touches the fifth icon K5 in the state shown in FIG. 23B, the image E having been drawn on the target thing B in the work order may no longer be drawn in the work order and thus the drawing is stopped.

Here, as shown in FIG. 23C, when the user touches a lower right side of the mobile terminal P, the corresponding augmented reality information may have information in which a portion of the image E corresponding to the touch point is being further drawn in a region having a predetermined area on the basis of the touch point.

Also, as shown in FIG. 24D, when the user touches a lower left side of the mobile terminal P, the corresponding augmented reality information may have information in which a portion of the image E corresponding to the touch point is being further drawn in a region having a predetermined area on the basis of the touch point.

That is, the user may generate the overlapping input information by touching the first icon K1 and the fifth icon K5, and the corresponding augmented reality information may include information corresponding to the overlapping input information.

Although not shown, the user may generate the overlapping input information by touching at least two of the plurality of icons K, and the corresponding augmented reality information may include information corresponding to the overlapping input information.

Also, as an example, the input information may further include information regarding a method of displaying an additional image M, which is different from the image E. In this case, the corresponding augmented reality information may include information in which the additional image M is being drawn on the target thing B.

In detail, as shown in FIG. 19, when the user touches a sixth icon K6 allowing the additional image M to be input while the augmented reality information A5 in which no wall painting is drawn on the target thing B is displayed on the mobile terminal P through the augmented reality information transmission step, a window capable of entering or selecting the additional image M may be displayed on the mobile terminal P, as shown in FIG. 24A. Here, when the user selects "♡," a screen in which the image E is displayed on the target thing B may be displayed as shown in FIG. 24B. In this state, the user may select at which location "♡" will be displayed on the target thing B. The input information for the additional image M and the display location of the additional image M may be generated by such a touch, and the augmented reality provision server 10 may transmit the corresponding augmented reality information corresponding to the input information to the mobile terminal P through the input information reception step and the corresponding augmented reality information transmission step.

As a result, as shown in FIG. 24C, the corresponding augmented realty information may include information in which the additional image M as well as the image E is being drawn on the target thing B.

As shown in FIG. 24C, the input information may further include information regarding a method of displaying the image E and the additional image M on the target thing B in the mobile terminal P, and the corresponding augmented reality information may include information in which a portion of the image E is being drawn on the target thing B and information in which the additional image M is being drawn.

Also, although not shown, the user may generate the overlapping input information even from the image E and the additional image M by touching at least two of the above-described plurality of icons K, and the corresponding augmented reality information may include information corresponding to the overlapping input information for the image E and the additional image M.

The augmented reality provision server 10 that implements the augmented reality information providing method and the mobile terminal P that is provided with the augmented reality information will be described in detail below with reference to FIGS. 25 and 26.

As shown in FIG. 25, for example, the augmented reality provision server 10 may include a reception unit 400 configured to receive predetermined information from the mobile terminal P, a control unit 200 configured to process, compute, select, determine, and/or control data related to augmented reality information on the basis of the predetermined information received by the reception unit 400, a transmission unit 100 configured to deliver predetermined information related to the augmented reality information to the mobile terminal P, and a memory unit 500 configured to store data and/or information necessary to implement the augmented reality information providing method.

As shown in FIG. 26, for example, the mobile terminal P may include a terminal input unit P10 configured to receive predetermined information and/or data related to implementation of augmented reality information by a user's touch or the like, a terminal location generation unit P20 configured to generate information regarding where the mobile terminal P is located, a terminal communication unit P40 configured to receive or deliver the predetermined information and/or data from or to the augmented reality provision server 10, a terminal capture unit P50 configured to capture the predetermined information and/or data related to the augmented reality information, a terminal display unit P30 configured to display the information and/or data related to the augmented reality information to the user, and a terminal control unit P60 configured to control elements constituting the mobile terminal P or configured to process, compute, select, and/or determine information and/or data necessary to receive the augmented reality information.

As an example, the augmented reality provision server 10 may include the reception unit 400 configured to receive the capture information L which is generated by the mobile terminal P capturing the target thing B from the mobile terminal P.

As shown in FIG. 2, the mobile terminal P may generate the capture information L through the terminal capture unit P50 and deliver the capture information L to the reception unit 400 through the terminal communication unit P40.

Here, the augmented reality provision server 10 may include the control unit 200 configured to select the augmented reality information corresponding to the capture information L received from the mobile terminal P.

As described above, when the capture information L received from the mobile terminal P corresponds to any one of a plurality of pieces of capture information L previously input to the memory unit 500, the control unit 200 may select the corresponding augmented reality information from among a plurality of pieces of augmented reality information previously input to the memory unit 500.

Here, the selection may mean that any one of the plurality of pieces of previously input augmented reality information is automatically calculated by a previously input program.

Here, the augmented reality provision server 10 may include the transmission unit 100 configured to deliver the corresponding augmented reality information to the mobile terminal P.

When the augmented reality information is delivered through the transmission unit 100, the mobile terminal P may display the augmented reality information to the user through the terminal display.

Here, the reception unit 400 may receive, from the mobile terminal P, the input information generated by the mobile terminal P receiving an input from the user.

Also, the control unit 200 may generate the corresponding augmented reality information corresponding to the input information received from the mobile terminal P, and the reception unit 400 may deliver the corresponding augmented reality information to the mobile terminal P.

While the configuration and features of the present invention have been described with reference to exemplary embodiments of the present invention, the present invention is not limited thereto, and it will be apparent to those skilled in the art that various changes or modifications can be made within the spirit and scope of the present invention. Therefore, it should be noted that such changes or modifications fall within the scope of the appended claims.

The invention claimed is:

1. A method of an augmented reality provision server providing augmented reality information to a mobile terminal, the method comprising:

a capture information reception step in which the augmented reality provision server receives capture information generated by a first mobile terminal and a second mobile terminal capturing a target thing from the first mobile terminal and the second mobile terminal;

a first augmented reality information transmission step in which the augmented reality provision server selects first augmented reality information corresponding to the capture information received from the first mobile terminal and the second mobile terminal and transmits the first augmented reality information to the first mobile terminal and the second mobile terminal, wherein the first mobile terminal and the second mobile terminal are capable of displaying the first augmented reality information received from the augmented reality provision server to a user;

an input information reception step in which the augmented reality provision server receives, from the first mobile terminal, input information generated by the first mobile terminal receiving predetermined information from the user; and a second augmented reality information transmission step in which the augmented reality provision server transmits, to the first mobile terminal, second augmented reality information including the input information received from the first mobile terminal, the first mobile terminal being capable of displaying the second augmented reality information received from the augmented reality provision server to the user, wherein:

the input information reception step further comprises a display condition information reception step in which the augmented reality provision server receives, from the first mobile terminal, display condition information generated by the first mobile terminal receiving condition information regarding displaying of the input information from the user, the display condition information is information regarding the displaying of the input information on the second mobile terminal, the display condition information defined by the first mobile terminal is information regarding whether the input information is to be displayed on the second mobile terminal, in the second augmented reality information transmission step:

the augmented reality provision server transmits the second augmented reality information to the second mobile terminal when the display condition information is a condition allowing the input information to be displayed on the second mobile terminal, although the augmented reality provision server receives the capture information from the second mobile terminal, the augmented reality provision server does not transmit the second augmented reality information to the second mobile terminal when the display condition information is a condition not allowing the input information to be displayed on the second mobile terminal, and the display condition information is selected by the user from a list consisting of a plurality of conditions comprising information regarding whether the input information is to be displayed on the second mobile terminal and information regarding an order in which the input information is displayed on the second mobile terminal.

2. The method of claim 1, wherein the display condition information is information regarding a location at which the input information is displayed on the second mobile terminal.

3. The method of claim 1, wherein the display condition information is information regarding a period in which the input information is displayed on the second mobile terminal.

4. The method of claim 1, wherein the display condition information is information regarding a point of time at which the input information starts to be displayed on the second mobile terminal.

5. A method of an augmented reality provision server providing augmented reality information to a mobile terminal, the method comprising:

a capture information reception step in which the augmented reality provision server receives capture information generated by a first mobile terminal and a second mobile terminal capturing a target thing from the first mobile terminal and the second mobile terminal;

a first augmented reality information transmission step in which the augmented reality provision server selects first augmented reality information corresponding to the capture information received from the first mobile terminal and the second mobile terminal and transmits the first augmented reality information to the first mobile terminal and the second mobile terminal, wherein the first mobile terminal and the second mobile terminal are capable of displaying the first augmented reality information received from the augmented reality provision server to a user;

an input information reception step in which the augmented reality provision server receives, from the first mobile terminal, input information generated by the first mobile terminal receiving predetermined information from the user; and a second augmented reality information transmission step in which the augmented reality provision server transmits, to the first mobile terminal, second augmented reality information including the input information received from the first mobile terminal, the first mobile terminal being capable of displaying the second augmented reality information received from the augmented reality provision server to the user, wherein:

the input information reception step further comprises a display condition information reception step in which the augmented reality provision server receives, from the first mobile terminal, display condition information generated by the first mobile terminal receiving condition information regarding displaying of the input information from the user, the display condition information is information regarding the displaying of the input information on the second mobile terminal, the display condition information defined by the first mobile terminal is information regarding an order in which the input information is displayed on the second mobile terminal, in the second augmented reality information transmission step, the augmented reality provision server transmits the second augmented reality information including the input information having the order defined by the first mobile terminal to the second mobile terminal, and the display condition information is selected by the user from a list consisting of a plurality of conditions comprising information regarding whether the input information is to be displayed on the second mobile terminal and information regarding an order in which the input information is displayed on the second mobile terminal.

6. An augmented reality provision server comprising: a processing unit for processing a plurality of units comprising:

a reception unit configured to receive capture information generated by a first mobile terminal and a second mobile terminal capturing a target thing from the first mobile terminal and the second mobile terminal;

a control unit configured to select first augmented reality information corresponding to the capture information acquired from the reception unit from among a plurality of pieces of augmented reality information; and a transmission unit configured to deliver the first augmented reality information to the first mobile terminal and the second mobile terminal, wherein:

the reception unit receives predetermined input information from the first mobile terminal, the control unit generates second augmented reality information including the input information, the transmission unit transmits the second augmented reality information to the first mobile terminal, the reception unit receives predetermined display condition information from the first mobile terminal, the display condition information is information regarding displaying of the input information on the second mobile terminal, the display condition information defined by the first mobile terminal is information regarding whether the input information is to be displayed on the second mobile terminal, the control unit transmits the second augmented reality information to the second mobile terminal through the transmission unit when the display condition information is a condition allowing the input information to be displayed on the second mobile terminal, although the reception unit receives the capture information from the second mobile terminal, the control unit does not transmit the second augmented reality information to the second mobile terminal through the transmission unit when the display condition information is a condition not allowing the input information to be displayed on the second mobile terminal, and the display condition information is selected by the user from a list consisting of a plurality of conditions comprising information regarding whether the input information is to be displayed on the second mobile terminal and information regarding an order in which the input information is displayed on the second mobile terminal.

7. The augmented reality provision server of claim 6, wherein the display condition information is information regarding a location at which the input information is displayed on the second mobile terminal.

8. The augmented reality provision server of claim 6, wherein the display condition information is information regarding a period in which the input information is displayed on the second mobile terminal.

9. The augmented reality provision server of claim 6, wherein the display condition information is information regarding a point of time at which the input information starts to be displayed on the second mobile terminal.

10. An augmented reality provision server comprising: a processing unit for processing a plurality of units comprising:
- a reception unit configured to receive capture information generated by a first mobile terminal and a second mobile terminal capturing a target thing from the first mobile terminal and the second mobile terminal;
- a control unit configured to select first augmented reality information corresponding to the capture information acquired from the reception unit from among a plurality of pieces of augmented reality information; and
- a transmission unit configured to deliver the first augmented reality information to the first mobile terminal and the second mobile terminal, wherein:
the reception unit receives predetermined input information from the first mobile terminal,
the control unit generates second augmented reality information including the input information,
the transmission unit transmits the second augmented reality information to the first mobile terminal,
the reception unit receives predetermined display condition information from the first mobile terminal,
the display condition information is information regarding displaying of the input information on the second mobile terminal,
the display condition information defined by the first mobile terminal is information regarding an order in which the input information is displayed on the second mobile terminal,
the control unit transmits the second augmented reality information including the input information having the order defined by the first mobile terminal to the second mobile terminal through the transmission unit, and
the display condition information is selected by the user from a list consisting of a plurality of conditions comprising information regarding whether the input information is to be displayed on the second mobile terminal and information regarding an order in which the input information is displayed on the second mobile terminal.

* * * * *